(12) United States Patent
Patton et al.

(10) Patent No.: US 10,628,601 B2
(45) Date of Patent: Apr. 21, 2020

(54) DETECTING EVENTS FROM FEATURES DERIVED FROM INGESTED SIGNALS

(71) Applicant: Banjo, Inc., Park City, UT (US)

(72) Inventors: Damien Patton, Park City, UT (US); Armando Guereca-Pinuelas, Cottonwood Heights, UT (US); K W Justin Leung, Redwood City, CA (US); Christian Gratton, Las Vegas, NV (US)

(73) Assignee: Banjo, Inc., South Jordan, UT (US)

( * ) Notice: Subject to any disclaimer, the term of this patent is extended or adjusted under 35 U.S.C. 154(b) by 0 days.

(21) Appl. No.: 16/516,684

(22) Filed: Jul. 19, 2019

(65) Prior Publication Data

US 2019/0347436 A1 Nov. 14, 2019

Related U.S. Application Data

(63) Continuation-in-part of application No. 16/029,481, filed on Jul. 6, 2018.

(60) Provisional application No. 62/628,866, filed on Feb. 9, 2018, provisional application No. 62/654,274, filed on Apr. 6, 2018, provisional application No. 62/654,277, filed on Apr. 6, 2018, provisional application No. 62/664,001, filed on Apr. 27, 2018, provisional application No. 62/682,176, filed on Jun. 8, 2018, provisional application No. 62/682,177, filed
(Continued)

(51) Int. Cl.
G06F 21/62 (2013.01)
H04L 29/06 (2006.01)
G06F 21/60 (2013.01)

(52) U.S. Cl.
CPC ........ *G06F 21/6218* (2013.01); *G06F 21/604* (2013.01); *H04L 63/04* (2013.01)

(58) Field of Classification Search
CPC ..... H04L 63/04; G06F 21/6218; G06F 21/604
USPC ....................................................... 707/737
See application file for complete search history.

(56) References Cited

U.S. PATENT DOCUMENTS

2002/0055924 A1   5/2002 Liming
2011/0184844 A1*  7/2011 Parsons ................. G06Q 40/00
                                          705/35
2013/0293378 A1  11/2013 Aninye et al.
(Continued)

OTHER PUBLICATIONS

Non-Final Office Action received in U.S. Appl. No. 16/536,452, dated Nov. 4, 2019, 21 pages.

*Primary Examiner* — Evan Aspinwall
(74) *Attorney, Agent, or Firm* — Michael B. Dodd; R. Jace Hirschi

(57) ABSTRACT

The present invention extends to methods, systems, and computer program products for detecting events from features derived from ingested signals. In one aspect, an event detection infrastructure determines that characteristics of multiple (and possibly private and/or non-private) signals, when considered collectively, indicate an event of interest to one or more parties. In another aspect, an evaluation module determines that characteristics of one or more (possibly private and/or non-private) signals indicate a possible event of interest to one or more parties. A validator then determines that characteristics of one or more other (possibly private and/or non-private) signals validate the possible event as an actual event of interest to the one or more parties. Signal features can be used to compute probabilities of events occurring.

24 Claims, 15 Drawing Sheets

Related U.S. Application Data on Jun. 8, 2018, provisional application No. 62/714,572, filed on Aug. 3, 2018.

(56) References Cited

U.S. PATENT DOCUMENTS

| | | | |
|---|---|---|---|
| 2014/0006244 A1* | 1/2014 | Crowley | G06Q 40/04 |
| | | | 705/37 |
| 2014/0149305 A1 | 5/2014 | Aziz et al. | |
| 2016/0241655 A1* | 8/2016 | Yao | G06F 21/6218 |
| 2017/0075995 A1* | 3/2017 | Fleischman | G06Q 30/02 |

* cited by examiner

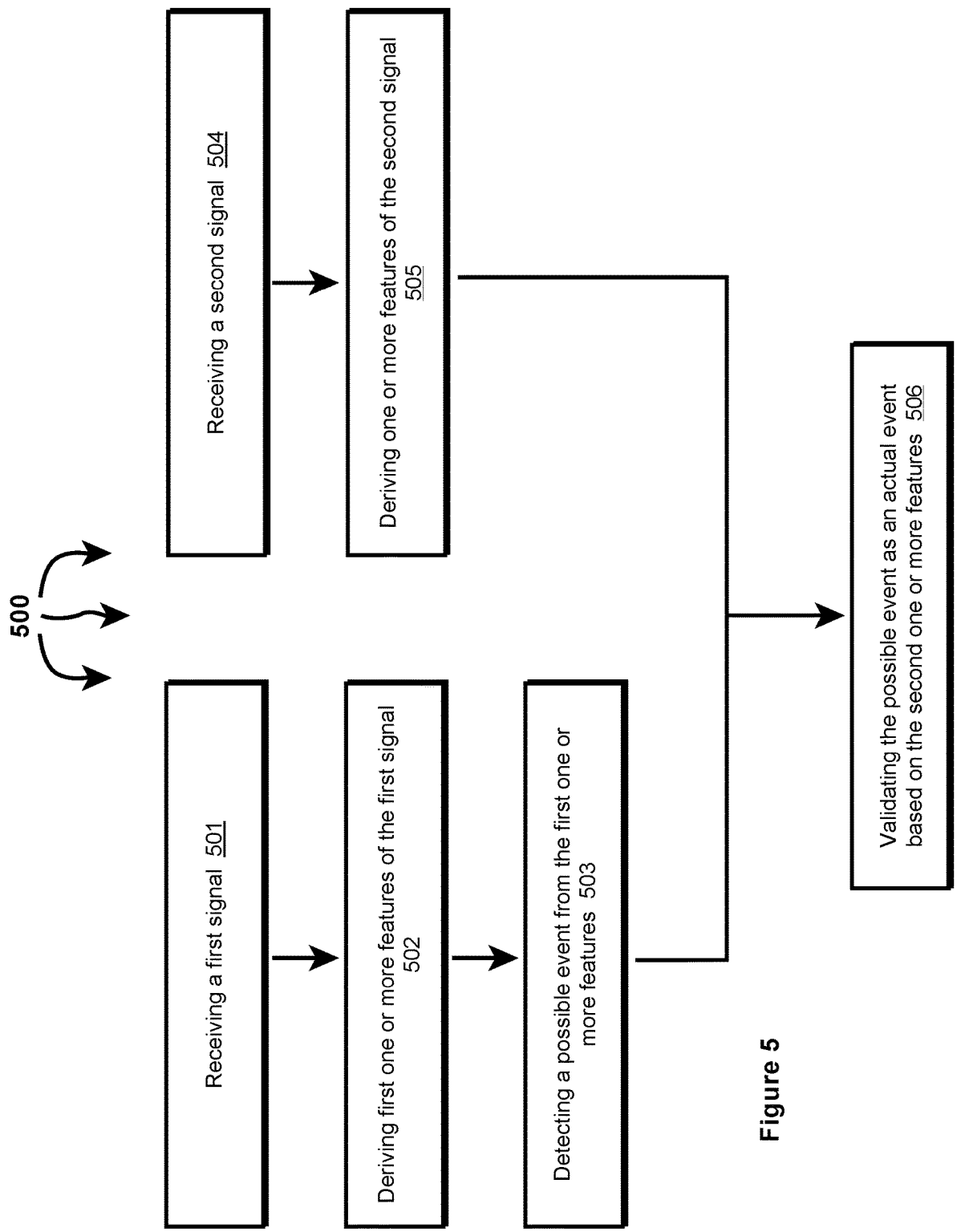

DETECTING EVENTS FROM FEATURES DERIVED FROM INGESTED SIGNALS

CROSS-REFERENCE TO RELATED APPLICATIONS

This application is a continuation-in-part of U.S. patent application Ser. No. 16/029,481, entitled "Detecting Events From Features Derived From Multiple Ingested Signals", filed Jul. 6, 2018 which is incorporated herein in its entirety. This application claims the benefit of U.S. Provisional Patent Application Ser. No. 62/714,572, entitled "Normalizing Disparate Siloed Signals For Presentation And For Combination With Other Signals To Detect Events," filed Aug. 3, 2018 which is incorporated herein in its entirety.

U.S. patent application Ser. No. 16/029,481 claims the benefit of U.S. Provisional Patent Application Ser. No. 62/628,866, entitled "Multi Source Validation", filed Feb. 9, 2018 which is incorporated herein in its entirety. U.S. patent application Ser. No. 16/029,481 claims the benefit of U.S. Provisional Patent Application Ser. No. 62/654,274, entitled "Detecting Events From Multiple Signals", filed Apr. 6, 2018 which is incorporated herein in its entirety. U.S. patent application Ser. No. 16/029,481 claims the benefit of U.S. Provisional Patent Application Ser. No. 62/654,277 entitled, "Validating Possible Events With Additional Signals", filed Apr. 6, 2018 which is incorporated herein in its entirety. U.S. patent application Ser. No. 16/029,481 claims the benefit of U.S. Provisional Patent Application Ser. No. 62/664,001, entitled, "Normalizing Different Types Of Ingested Signals Into A Common Format", filed Apr. 27, 2018. U.S. patent application Ser. No. 16/029,481 claims the benefit of U.S. Provisional Patent Application Ser. No. 62/682,176 entitled "Detecting An Event From Multiple Sources", filed Jun. 8, 2018 which is incorporated herein in its entirety. U.S. patent application Ser. No. 16/029,481 claims the benefit of U.S. Provisional Patent Application Ser. No. 62/682,177 entitled "Detecting An Event From Multi-Source Event Probability", filed Jun. 8, 2018 which is incorporated herein in its entirety.

BACKGROUND

1. Background and Relevant Art

Entities (e.g., parents, guardians, friends, relatives, teachers, social workers, first responders, hospitals, delivery services, media outlets, government entities, etc.) may desire to be made aware of relevant events (e.g., fires, accidents, police presence, shootings, etc.) as close as possible to the events' occurrence. However, entities typically are not made aware of an event until after a person observes the event (or the event aftermath) and calls authorities.

In general, techniques that attempt to automate event detection are unreliable. Some techniques have attempted to mine social media data to detect the planning of events and forecast when events might occur. However, events can occur without prior planning and/or may not be detectable using social media data. Further, these techniques are not capable of meaningfully processing available data nor are these techniques capable of differentiating false data (e.g., hoax social media posts)

Other techniques use textual comparisons to compare textual content (e.g., keywords) in a data stream to event templates in a database. If text in a data stream matches keywords in an event template, the data stream is labeled as indicating an event.

Additional techniques use event specific sensors to detect specified types of event. For example, earthquake detectors can be used to detect earthquakes.

BRIEF SUMMARY

Examples extend to methods, systems, and computer program products for detecting events from features derived from ingested signals, In general, signal ingestion modules ingest different types of raw structured and unstructured signals on an ongoing basis, including private, non-private, and public signals. The signal ingestion modules normalize raw signals into normalized signals having a Time, Location, Context (or "TLC") format. Time can be a time of origin or "event time" of a signal. Location can be anywhere across a geographic area, such as, a country (e.g., the United States), a State, a defined area, an impacted area, an area defined by a geo cell, an address, etc.

Context indicates circumstances surrounding formation/origination of a raw signal in terms that facilitate understanding and assessment of the raw signal. The context of a raw signal can be derived from express as well as inferred signal features of the raw signal.

Signal ingestion modules can include one or more single source classifiers. A single source classifier can compute a single source probability for a raw signal from (inferred and/or express) signal features of the raw signal. A single source probability can reflect a mathematical probability or approximation of a mathematical probability of an event (e.g., fire, accident, weather, police presence, etc.) actually occurring. A single source classifier can be configured to compute a single source probability for a single event type or to compute a single source probability for each of a plurality of different event types.

As such, single source probabilities and corresponding probability details can represent Context. Probability details can indicate (e.g., can include a hash field indicating) a probability version and (express and/or inferred) signal features considered in a signal source probability calculation.

Concurrently with signal ingestion, an event detection infrastructure considers features of different combinations of normalized signals to attempt to identify events of interest to various parties. For example, the event detection infrastructure can determine that features of multiple different signals collectively indicate an event of interest to one or more parties. Alternately, the event detection infrastructure can determine that features of one or more signals indicate a possible event of interest to one or more parties. The event detection infrastructure then determines that features of one or more other signals validate the possible event as an actual event of interest to the one or more parties. Signal features can include: signal type, signal source, signal content, signal time (T), signal location (L), signal context (C), other circumstances of signal creation, etc.

The event detection infrastructure can group signals having sufficient temporal similarity and sufficient spatial similarity to one another in a signal sequence. In one aspect, any signal having sufficient temporal and spatial similarity to another signal can be added to a signal sequence.

In another aspect, a single source probability for a signal is computed from features of the signal. The single source probability can reflect a mathematical probability or approximation of a mathematical probability of an event actually occurring. A signal having a signal source probability above a threshold can be indicated as an "elevated"

signal. Elevated signals can be used to initiate and/or can be added to a signal sequence. On the other hand, non-elevated signals may not be added to a signal sequence.

A multi-source probability can be computed from features of multiple normalized signals, including normalized signals in a signal sequence. Features used to compute a multi-source probability can include multiple single source probabilities as well as other features derived from multiple signals. The multi-source probability can reflect a mathematical probability or approximation of a mathematical probability of an event actually occurring based on multiple normalized signals (e.g., a signal sequence). A multi-source probability can change over time as normalized signals age or when a new normalized signal is received (e.g., added to a signal sequence).

An organization can configure data privacy settings (e.g., on a per signal basis, on a per signal source basis, on a per signal type basis, on a per content basis, per organization, etc.) to control aggregation of their signals and/or access to their signals. Signal aggregation and signal access can be controlled separately. Thus, an organization can configure data aggregation privacy settings and data access privacy settings separately. For example, an organization can configure data aggregation privacy settings and/or data access privacy settings defining a signal as private. Defining a signal as private can limit aggregation of the signal and/or limit access to the signal (as well as intelligence derived therefrom) to the organization (including sub units within the organization).

In another aspect, an organization can configure data aggregation privacy settings and/or data access privacy settings defining a signal as non-private. Defining a signal as non-private can limit aggregation of the signal and/or limit access to the signal (as well as intelligence derived therefrom) to the organization (including sub units) and one or more additional specified entities and/or organizations. When a signal is defined as non-private, a list of the one or more additional entities and/or organizations can be specified. The list can indicate entities and/or other organizations permitted to aggregate with and/or access a signal.

Signal ingestion modules, an event detection infrastructure, and event notification can adhere to data privacy settings for a plurality of different organizations to prevent inappropriate signal aggregation and inappropriate signal access. The signal ingestion modules, event detection infrastructure, and event notification can concurrently ingest and process signals and events associated with a plurality of different organizations while adhering to data privacy settings for each of the plurality of different organizations.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which:

FIG. 5 illustrates a flow chart of an example method for detecting an event from features derived from multiple signals

DETAILED DESCRIPTION

Figure 1:
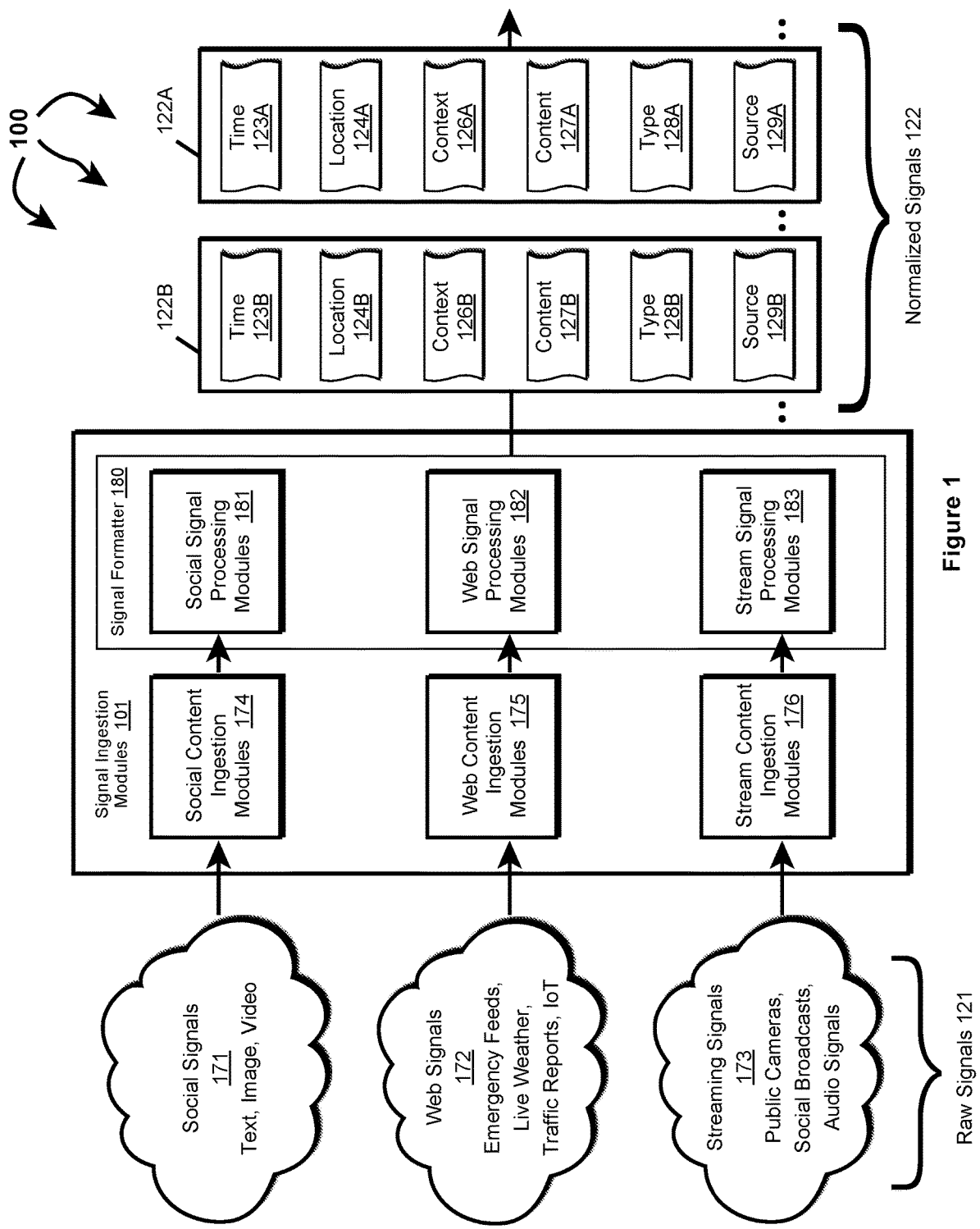
FIG. 1 illustrates an example computer architecture that facilitates ingesting signals.

Examples extend to methods, systems, and computer program products for detecting events from features derived from ingested signals.

In general, signal ingestion modules ingest different types of raw structured and unstructured signals on an ongoing basis, including private, non-private, and public signals. The signal ingestion modules normalize raw signals into normalized signals having a Time, Location, Context (or "TLC") format. Per signal type, signal ingestion modules identify and/or infer a time, a location, and a context associated with a signal. Different ingestion modules can be utilized/tailored to identify time, location, and context for different signal types. Time (T) can be a time of origin or "event time" of a signal. Location (L) can be anywhere across a geographic area, such as, a country (e.g., the United States), a State, a defined area, an impacted area, an area defined by a geo cell, an address, etc.

Context (C) indicates circumstances surrounding formation/origination of a raw signal in terms that facilitate understanding and assessment of the raw signal. The context of a raw signal can be derived from express as well as inferred signal features of the raw signal.

Signal ingestion modules can include one or more single source classifiers. A single source classifier can compute a single source probability for a raw signal from features of the raw signal. A single source probability can reflect a mathematical probability or approximation of a mathematical probability (e.g., a percentage between 0%-100%) of an event actually occurring. A single source classifier can be configured to compute a single source probability for a single event type or to compute a single source probability for each of a plurality of different event types. A single source classifier can compute a single source probability using artificial intelligence, machine learning, neural networks, logic, heuristics, etc.

As such, single source probabilities and corresponding probability details can represent Context. Probability details can indicate (e.g., can include a hash field indicating) a probability version and (express and/or inferred) signal features considered in a signal source probability calculation.

Concurrently with signal ingestion, the event detection infrastructure considers features of different combinations of normalized signals to attempt to identify events of interest to various parties. Features can be derived from an individual signal and/or from a group of signals.

For example, the event detection infrastructure can derive first features of a first normalized signal and can derive second features of a second normalized signal. Individual signal features can include: signal type, signal source, signal content, signal time (T), signal location (L), signal context (C), other circumstances of signal creation, etc. The event detection infrastructure can detect an event of interest to one or more parties from the first features and the second features collectively.

Alternately, the event detection infrastructure can derive first features of each normalized signal included in a first one or more normalized individual signals. The event detection infrastructure can detect a possible event of interest to one or more parties from the first features. The event detection infrastructure can derive second features of each normalized signal included in a second one or more individual signals. The event detection infrastructure can validate the possible event of interest as an actual event of interest to the one or more parties from the second features.

More specifically, the event detection infrastructure can use single source probabilities to detect and/or validate events. For example, the event detection infrastructure can detect an event of interest to one or more parties based on a single source probability of a first signal and a single source probability of second signal collectively. Alternately, the event detection infrastructure can detect a possible event of interest to one or more parties based on single source probabilities of a first one or more signals. The event detection infrastructure can validate the possible event as an actual event of interest to one or more parties based on single source probabilities of a second one or more signals.

The event detection infrastructure can group normalized signals having sufficient temporal similarity and/or sufficient spatial similarity to one another in a signal sequence. Temporal similarity of normalized signals can be determined by comparing Time (T) of the normalized signals. In one aspect, temporal similarity of a normalized signal and another normalized signal is sufficient when the Time (T) of the normalized signal is within a specified time of the Time (T) of the other normalized signal. A specified time can be virtually any time value, such as, for example, ten seconds, 30 seconds, one minute, two minutes, five minutes, ten minutes, 30 minutes, one hour, two hours, four hours, etc. A specified time can vary by detection type. For example, some event types (e.g., a fire) inherently last longer than other types of events (e.g., a shooting). Specified times can be tailored per detection type.

Spatial similarity of normalized signals can be determined by comparing Location (L) of the normalized signals. In one aspect, spatial similarity of a normalized signal and another normalized signal is sufficient when the Location (L) of the normalized signal is within a specified distance of the Location (L) of the other normalized signal. A specified distance can be virtually any distance value, such as, for example, a linear distance or radius (a number of feet, meters, miles, kilometers, etc.), within a specified number of geo cells of specified precision, etc.

In one aspect, any normalized signal having sufficient temporal and spatial similarity to another normalized signal can be added to a signal sequence.

In another aspect, a single source probability for a signal is computed from features of the signal. The single source probability can reflect a mathematical probability or approximation of a mathematical probability of an event actually occurring. A normalized signal having a signal source probability above a threshold (e.g., greater than 4%) is indicated as an "elevated" signal. Elevated signals can be used to initiate and/or can be added to a signal sequence. On the other hand, non-elevated signals may not be added to a signal sequence.

In one aspect, a first threshold is considered for signal sequence initiation and a second threshold is considered for adding additional signals to an existing signal sequence. A normalized signal having a single source probability above the first threshold can be used to initiate a signal sequence. After a signal sequence is initiated, any normalized signal having a single source probability above the second threshold can be added to the signal sequence.

The first threshold can be greater than the second threshold. For example, the first threshold can be 4% or 5% and the second threshold can be 2% or 3%. Thus, signals that are not necessarily reliable enough to initiate a signal sequence for an event can be considered for validating a possible event.

The event detection infrastructure can derive features of a signal grouping, such as, a signal sequence. Features of a signal sequence can include features of signals in the signal sequence, including single source probabilities. Features of a signal sequence can also include percentages, histograms, counts, durations, etc. derived from features of the signals included in the signal sequence. The event detection infrastructure can detect an event of interest to one or more parties from signal sequence features.

The event detection infrastructure can include one or more multi-source classifiers. A multi-source classifier can compute a multi-source probability for a signal sequence from features of the signal sequence. The multi-source probability can reflect a mathematical probability or approximation of a mathematical probability of an event (e.g., fire, accident, weather, police presence, etc.) actually occurring based on multiple normalized signals (e.g., the signal sequence). The multi-source probability can be assigned as an additional signal sequence feature. A multi-source classifier can be configured to compute a multi-source probability for a single event type or to compute a multi-source probability for each of a plurality of different event types. A multi-source classifier can compute a multi-source probability using artificial intelligence, machine learning, neural networks, etc.

A multi-source probability can change over time as a signal sequence ages or when a new signal is added to a signal sequence. For example, a multi-source probability for a signal sequence can decay over time. A multi-source probability for a signal sequence can also be recomputed when a new normalized signal is added to the signal sequence.

Multi-source probability decay can start after a specified period of time (e.g., 3 minutes) and decay can occur in accordance with a defined decay equation. In one aspect, a decay equation defines exponential decay of multi-source probabilities. Different decay rates can be used for different classes. Decay can be similar to radioactive decay, with different tau (i.e., mean lifetime) values used to calculate the "half life" of multi-source probability for different event types.

An organization can configure data privacy settings (e.g., on a per signal basis, on a per signal source basis, on a per signal type basis, on a per content basis, per organization, etc.) to control aggregation of their signals and/or access to their signals. Signal aggregation and signal access can be controlled separately. Thus, an organization can configure data aggregation privacy settings and data access privacy settings separately. For example, an organization can configure data aggregation privacy settings and/or data access privacy settings defining a signal as private. Defining a signal as private can limit aggregation of the signal and/or limit access to the signal (as well as intelligence derived therefrom) to the organization (including sub units within the organization).

In another aspect, an organization can configure data privacy settings defining a signal as non-private. Defining a signal as non-private can limit aggregation of the signal and/or limit access to the signal (as well as intelligence derived therefrom) to the organization (including sub units) and one or more additional specified entities and/or organizations. When a signal is defined as non-private, a list of the one or more additional entities and/or organizations can be specified.

Signal ingestion modules, an event detection infrastructure, and event notification can adhere to data privacy sets for a plurality of different organizations to prevent inappropriate signal aggregation and inappropriate signal access. The signal ingestion modules, event detection infrastructure, and event notification can concurrently ingest and process signals from a plurality of different organizations while adhering to data privacy settings for each of the plurality of different organizations.

Implementations can comprise or utilize a special purpose or general-purpose computer including computer hardware, such as, for example, one or more computer and/or hardware processors (including any of Central Processing Units (CPUs), and/or Graphical Processing Units (GPUs), general-purpose GPUs (GPGPUs), Field Programmable Gate Arrays (FPGAs), application specific integrated circuits (ASICs), Tensor Processing Units (TPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: raw signals, normalized signals, signal features, single source probabilities, possible events, events, signal sequences, signal sequence features, multisource probabilities, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, raw signals, normalized signals, signal features, single source probabilities, possible events, events, signal sequences, signal sequence features, multisource probabilities, etc.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more Field Programmable Gate Arrays (FPGAs) and/or one or more application specific integrated circuits (ASICs) and/or one or more Tensor Processing Units (TPUs) can be programmed to carry out one or more of the systems and procedures described herein. Hardware, software, firmware, digital components, or analog components can be specifically tailor-designed for a higher speed detection or artificial intelligence that can enable signal processing. In another example, computer code is configured for execution in one or more processors, and may include hardware logic/electrical circuitry controlled by the computer code. These example devices are provided herein purposes of illustration, and are not intended to be limiting. Embodiments of the present disclosure may be implemented in further types of devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

In this description and the following claims, a "geo cell" is defined as a piece of "cell" in a grid in any form. In one aspect, geo cells are arranged in a hierarchical structure. Cells of different geometries can be used.

A "geohash" is an example of a "geo cell".

In this description and the following claims, "geohash" is defined as a geocoding system which encodes a geographic location into a short string of letters and digits. Geohash is a hierarchical spatial data structure which subdivides space into buckets of grid shape (e.g., a square). Geohashes offer properties like arbitrary precision and the possibility of gradually removing characters from the end of the code to reduce its size (and gradually lose precision). As a consequence of the gradual precision degradation, nearby places will often (but not always) present similar prefixes. The longer a shared prefix is, the closer the two places are. geo cells can be used as a unique identifier and to represent point data (e.g., in databases).

In one aspect, a "geohash" is used to refer to a string encoding of an area or point on the Earth. The area or point on the Earth may be represented (among other possible coordinate systems) as a latitude/longitude or Easting/Northing—the choice of which is dependent on the coordinate system chosen to represent an area or point on the Earth. geo cell can refer to an encoding of this area or point, where the geo cell may be a binary string comprised of 0s and 1s corresponding to the area or point, or a string comprised of 0s, 1s, and a ternary character (such as X)—which is used to refer to a don't care character (0 or 1). A geo cell can also be represented as a string encoding of the area or point, for example, one possible encoding is base-32, where every 5 binary characters are encoded as an ASCII character.

Depending on latitude, the size of an area defined at a specified geo cell precision can vary. In one aspect, the areas defined at various geo cell precisions are approximately:

| GeoHash Length/Precision | Width × Height |
| --- | --- |
| 1 | 5,009.4 km × 4,992.6 km |
| 2 | 1,252.3 km × 624.1 km |
| 3 | 156.5 km × 156 km |
| 4 | 39.1 km × 19.5 km |
| 5 | 4.9 km × 4.9 km |
| 6 | 1.2 km × 609.4 m |
| 7 | 152.9 m × 152.4 m |
| 8 | 38.2 m × 19 m |
| 9 | 4.8 m × 4.8 m |
| 10 | 1.2 m × 59.5 cm |
| 11 | 14.9 cm × 14.9 cm |
| 12 | 3.7 cm × 1.9 cm |

Other geo cell geometries, such as, hexagonal tiling, triangular tiling, etc. are also possible. For example, the H3 geospatial indexing system is a multi-precision hexagonal tiling of a sphere (such as the Earth) indexed with hierarchical linear indexes.

In another aspect, geo cells are a hierarchical decomposition of a sphere (such as the Earth) into representations of regions or points based a Hilbert curve (e.g., the S2 hierarchy or other hierarchies). Regions/points of the sphere can be projected into a cube and each face of the cube includes a quad-tree where the sphere point is projected into. After that, transformations can be applied and the space discretized. The geo cells are then enumerated on a Hilbert Curve (a space-filling curve that converts multiple dimensions into one dimension and preserves the locality).

Due to the hierarchical nature of geo cells, any signal, event, entity, etc., associated with a geo cell of a specified precision is by default associated with any less precise geo cells that contain the geo cell. For example, if a signal is associated with a geo cell of precision 9, the signal is by default also associated with corresponding geo cells of precisions 1, 2, 3, 4, 5, 6, 7, and 8. Similar mechanisms are applicable to other tiling and geo cell arrangements. For example, S2 has a cell level hierarchy ranging from level zero ($85,011,012 \text{ km}^2$) to level 30 (between $0.48 \text{ cm}^2$ to $0.96 \text{ cm}^2$).

Signal Ingestion and Normalization

Signal ingestion modules ingest a variety of raw structured and/or unstructured signals on an on going basis and in essentially real-time. Raw signals can include social posts, live broadcasts, traffic camera feeds, other camera feeds (e.g., from other public cameras or from CCTV cameras), listening device feeds, 911 calls, weather data, planned events, IoT device data, crowd sourced traffic and road information, satellite data, air quality sensor data, smart city sensor data, public radio communication (e.g., among first responders and/or dispatchers, between air traffic controllers and pilots), etc. The content of raw signals can include images, video, audio, text, etc. Generally, the signal ingestion modules normalize raw signals into normalized signals, for example, having a Time, Location, Context (or "TLC") format.

Different types of ingested signals (e.g., social media signals, web signals, and streaming signals) can be used to identify events. Different types of signals can include different data types and different data formats. Data types can include audio, video, image, and text. Different formats can include text in XML, text in JavaScript Object Notation (JSON), text in RSS feed, plain text, video stream in Dynamic Adaptive Streaming over HTTP (DASH), video stream in HTTP Live Streaming (HLS), video stream in Real-Time Messaging Protocol (RTMP), etc.

Time (T) can be a time of origin or "event time" of a signal. In one aspect, a raw signal includes a time stamp and the time stamp is used to calculate Time (T). Location (L) can be anywhere across a geographic area, such as, a country (e.g., the United States), a State, a defined area, an impacted area, an area defined by a geo cell, an address, etc.

Context indicates circumstances surrounding formation/origination of a raw signal in terms that facilitate understanding and assessment of the raw signal. The context of a raw signal can be derived from express as well as inferred signal features of the raw signal.

Signal ingestion modules can include one or more single source classifiers. A single source classifier can compute a single source probability for a raw signal from features of the raw signal. A single source probability can reflect a mathematical probability or approximation of a mathematical probability (e.g., a percentage between 0%-100%) of an event (e.g., fire, accident, weather, police presence, shooting, etc.) actually occurring. A single source classifier can be configured to compute a single source probability for a single event type or to compute a single source probability for each of a plurality of different event types. A single source classifier can compute a single source probability using artificial intelligence, machine learning, neural networks, logic, heuristics, etc.

As such, single source probabilities and corresponding probability details can represent Context (C). Probability details can indicate (e.g., can include a hash field indicating) a probability version and (express and/or inferred) signal features considered in a signal source probability calculation.

Per signal type and signal content, different normalization modules can be used to extract, derive, infer, etc. time, location, and context from/for a raw signal. For example, one set of normalization modules can be configured to extract/derive/infer time, location and context from/for social signals. Another set of normalization modules can be configured to extract/derive/infer time, location and context from/for Web signals. A further set of normalization modules can be configured to extract/derive/infer time, location and context from/for streaming signals.

Normalization modules for extracting/deriving/inferring time, location, and context can include text processing modules, NLP modules, image processing modules, video processing modules, etc. The modules can be used to extract/derive/infer data representative of time, location, and context for a signal. Time, Location, and Context for a signal can be extracted/derived/inferred from metadata and/or content of the signal. For example, NLP modules can analyze metadata and content of a sound clip to identify a time, location, and keywords (e.g., fire, shooter, etc.). An acoustic listener can also interpret the meaning of sounds in a sound clip (e.g., a gunshot, vehicle collision, etc.) and convert to relevant context. Live acoustic listeners can determine the distance and direction of a sound. Similarly, image processing modules can analyze metadata and pixels in an image to identify a time, location and keywords (e.g., fire, shooter, etc.). Image processing modules can also interpret the meaning of parts of an image (e.g., a person holding a gun, flames, a store logo, etc.) and convert to relevant context. Other modules can perform similar operations for other types of content including text and video.

Per signal type, each set of normalization modules can differ but may include at least some similar modules or may share some common modules. For example, similar (or the same) image analysis modules can be used to extract named entities from social signal images and public camera feeds. Likewise, similar (or the same) NLP modules can be used to extract named entities from social signal text and web text.

In some aspects, an ingested signal includes expressly defined Time, Location, and Context upon ingestion. In other aspects, an ingested signal lacks an expressly defined Location and/or an expressly defined Context upon ingestion. In these other aspects, Location and/or Context can be inferred from features of an ingested signal and/or through reference to other data sources.

In further aspects, Time may not be included, or an included time may not be given with high precision and is inferred. For example, a user may post an image to a social network which had been taken some indeterminate time earlier.

Normalization modules can use named entity recognition and reference to a geo cell database to infer location. Named entities can be recognized in text, images, video, audio, or sensor data. The recognized named entities can be compared to named entities in geo cell entries. Matches indicate possible signal origination in a geographic area defined by a geo cell.

As such, a normalized signal can include a Time, a Location, a Context (e.g., single source probabilities and probability details), a signal type, a signal source, and content.

In one aspect, frequentist inference technique is used to determine a single source probability. A database maintains mappings between different combinations of signal properties and ratios of signals turning into events (a probability) for that combination of signal properties. The database is queried with the combination of signal properties. The database returns a ratio of signals having the signal properties turning into events. The ratio is assigned to the signal. A combination of signal properties can include: (1) event class (e.g., fire, accident, weather, etc.), (2) media type (e.g., text, image, audio, etc.), (3) source (e.g., twitter, traffic camera, first responder radio traffic, etc.), and (4) geo type (e.g., geo cell, region, or non-geo).

In another aspect, a single source probability is calculated by single source classifiers (e.g., machine learning models, artificial intelligence, neural networks, etc.) that consider hundreds, thousands, or even more signal features of a signal. Single source classifiers can be based on binary models and/or multi-class models.

Output from a single source classifier can be adjusted to more accurately represent a probability that a signal is a "true positive". For example, 1,000 signals with classifier output of 0.9 may include 80% as true positives. Thus, single source probability can be adjusted to 0.8 to more accurately reflect probability of the signal being a True event. "Calibration" can be done in such a way that for any "calibrated score" the score reflects the true probability of a true positive outcome.

FIG. 1 depicts computer architecture 100 that facilitates ingesting and normalizing signals. As depicted, computer architecture 100 includes signal ingestion modules 101, social signals 171, Web signals 172, and streaming signals 173. Signal ingestion modules 101, social signals 171, Web signals 172, and streaming signals 173 can be connected to (or be part of) a network, such as, for example, a system bus, a Local Area Network ("LAN"), a Wide Area Network ("WAN"), and even the Internet. Accordingly, signal ingestion modules 101, social signals 171, Web signals 172, and streaming signals 173 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

Signal ingestion module(s) 101 can ingest raw signals 121, including social signals 171, web signals 172, and streaming signals 173 (e.g., social posts, traffic camera feeds, other camera feeds, listening device feeds, 911 calls, weather data, planned events, IoT device data, crowd sourced traffic and road information, satellite data, air quality sensor data, smart city sensor data, public radio communication, etc.) on going basis and in essentially real-time. Signal ingestion module(s) 101 include social content ingestion modules 174, web content ingestion modules 176, stream content ingestion modules 177, and signal formatter 180. Signal formatter 180 further includes social signal processing module 181, web signal processing module 182, and stream signal processing modules 183.

For each type of signal, a corresponding ingestion module and signal processing module can interoperate to normalize the signal into a Time, Location, Context (TLC) format. For example, social content ingestion modules 174 and social signal processing module 181 can interoperate to normalize social signals 171 into the TLC format. Similarly, web content ingestion modules 176 and web signal processing module 182 can interoperate to normalize web signals 172 into the TLC format. Likewise, stream content ingestion modules 177 and stream signal processing modules 183 can interoperate to normalize streaming signals 173 into the TLC format.

In one aspect, signal content exceeding specified size requirements (e.g., audio or video) is cached upon ingestion. Signal ingestion modules 101 include a URL or other identifier to the cached content within the context for the signal.

Signal formatter 180 can include one or more single signal classifiers classifying ingested signals. The one or more single signal classifiers can assign one or more signal source probabilities (e.g., between 0%-100%) to each ingested signal. Each single source probability is a probability of the ingested signal being a particular category of event (e.g., fire, weather, medical, accident, police presence, etc.). Ingested signals with a sufficient single source probability (e.g., >=to 4%) are considered "elevated" signals.

In one aspect, signal formatter 180 includes modules for determining a single source probability as a ratio of signals turning into events based on the following signal properties: (1) event class (e.g., fire, accident, weather, etc.), (2) media type (e.g., text, image, audio, etc.), (3) source (e.g., twitter, traffic camera, first responder radio traffic, etc.), and (4) geo type (e.g., geo cell, region, or non-geo). Probabilities can be stored in a lookup table for different combinations of the signal properties. Features of a signal can be derived and used to query the lookup table. For example, the lookup table can be queried with terms ("accident", "image", "twitter", "region"). The corresponding ratio (probability) can be returned from the table.

In another aspect, signal formatter 180 includes a plurality of single source classifiers (e.g., artificial intelligence, machine learning modules, neural networks, etc.). Each single source classifier can consider hundreds, thousands, or even more signal features of a signal. Signal features of a signal can be derived and submitted to a signal source classifier. The single source classifier can return a probability that a signal indicates a type of event. Single source classifiers can be binary classifiers or multi-source classifiers.

Raw classifier output can be adjusted to more accurately represent a probability that a signal is a "true positive". For example, 1,000 signals whose raw classifier output is 0.9 may include 80% as true positives. Thus, probability can be adjusted to 0.8 to reflect true probability of the signal being a true positive. "Calibration" can be done in such a way that for any "calibrated score" this score reflects the true probability of a true positive outcome.

Signal ingestion modules 101 can include one or more single source probabilities and corresponding probability details in the context of a normalized signal. Probability details can indicate a probability version and features used to calculate the probability. In one aspect, a probability version and signal feature are contained in a hash field.

Thus in general, any of the received raw signals can be normalized into normalized signals including Time, Location, Context, signal source, signal type, and content. Signal ingestion modules 101 can send normalized signals 122 to event detection infrastructure 103. For example, signal ingestion modules 101 can send normalized signal 122A, including time 123A, location 124A, context 126A, content 127A, type 128A, and source 129A to event detection infrastructure 103. Similarly, signal ingestion modules 101 can send normalized signal 122B, including time 123B, location 124B, context 126B, content 127B, type 128B, and source 129B to event detection infrastructure 103. Signal ingestion modules 101 can also send normalized signal 122C (depicted in FIG. 6), including time 123C, location 124C, context 126C, content 127C, type 128C, and source 129C to event detection infrastructure 103.

Multi-Signal Detection

Figure 2:
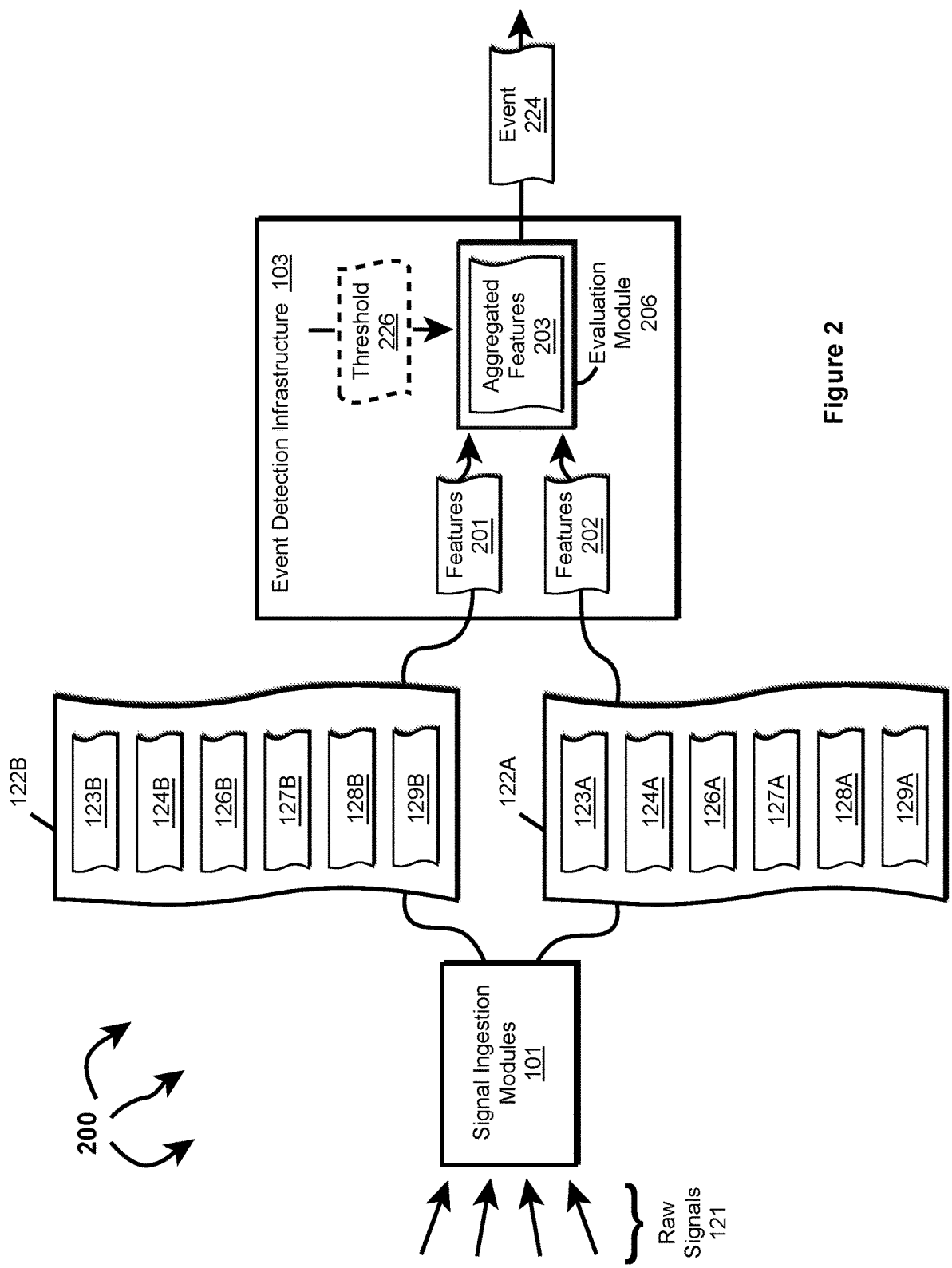
FIG. 2 illustrates an example computer architecture that facilitates detecting an event from features derived from multiple signals.

FIG. 2 illustrates an example computer architecture 200 that facilitates detecting an event from features derived from multiple signals. As depicted, computer architecture 200 further includes event detection infrastructure 103. Event infrastructure 103 can be connected to (or be part of) a network with signal ingestion modules 101. As such, signal ingestion modules 101 and event detection infrastructure 103 can create and exchange message related data over the network.

As depicted, event detection infrastructure 103 further includes evaluation module 206. Evaluation module 206 is configured to determine if features of a plurality of normalized signals collectively indicate an event. Evaluation module 206 can detect (or not detect) an event based on one or more features of one normalized signal in combination with one or more features of another normalized signal.

Figure 3:
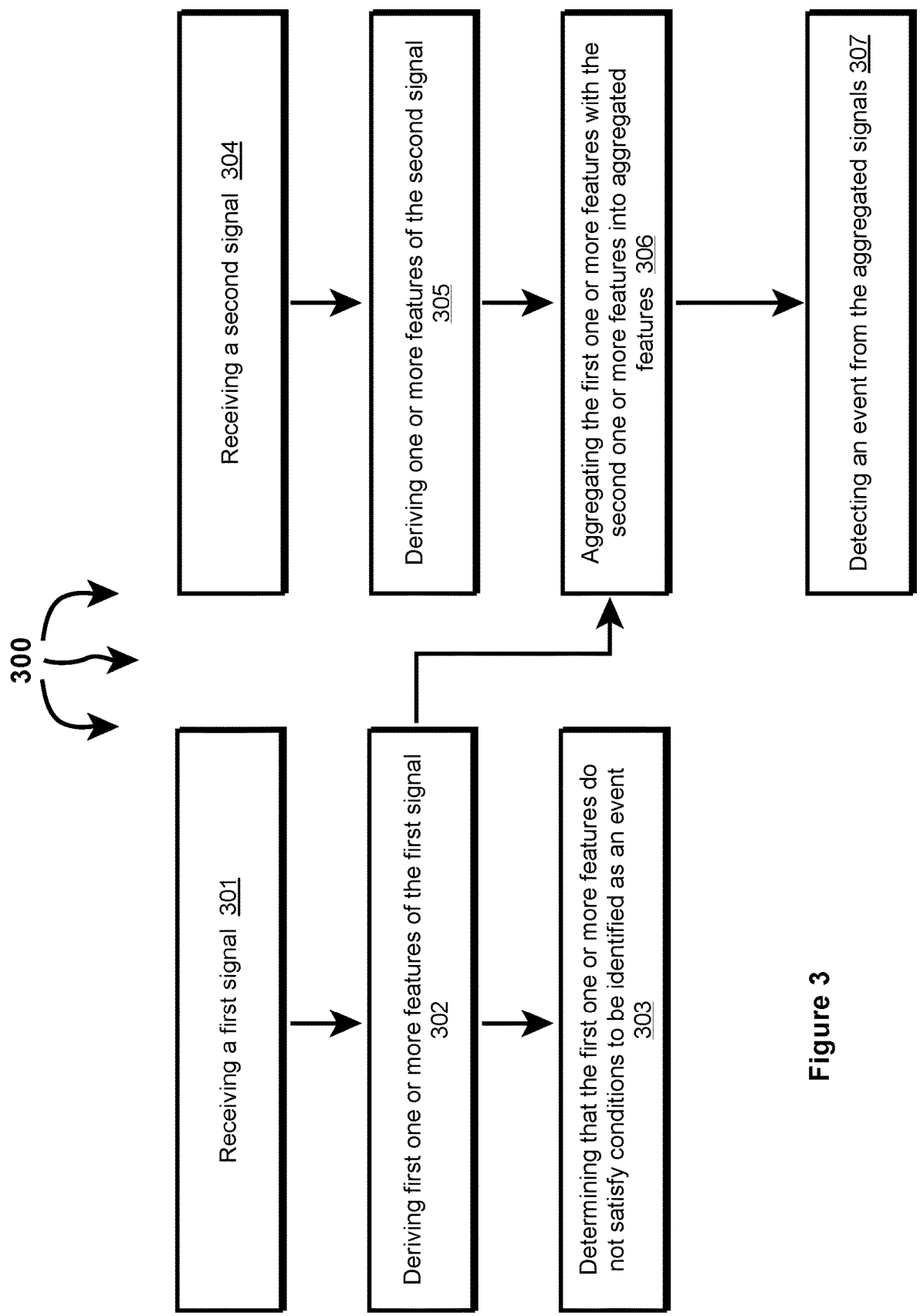
FIG. 3 illustrates a flow chart of an example method for detecting an event from features derived from multiple signals.

FIG. 3 illustrates a flow chart of an example method 300 for detecting an event from features derived from multiple signals. Method 300 will be described with respect to the components and data in computer architecture 200.

Method 300 includes receiving a first signal (301). For example, event detection infrastructure 103 can receive normalized signal 122B. Method 300 includes deriving first one or more features of the first signal (302). For example, event detection infrastructure 103 can derive features 201 of normalized signal 122B. Features 201 can include and/or be derived from time 123B, location 124B, context 126B, content 127B, type 128B, and source 129B. Event detection infrastructure 103 can also derive features 201 from one or more single source probabilities assigned to normalized signal 122B.

Method 300 includes determining that the first one or more features do not satisfy conditions to be identified as an event (303). For example, evaluation module 206 can determine that features 201 do not satisfy conditions to be identified as an event. That is, the one or more features of normalized signal 122B do not alone provide sufficient evidence of an event. In one aspect, one or more single source probabilities assigned to normalized signal 122B do not satisfy probability thresholds in thresholds 226.

Method 300 includes receiving a second signal (304). For example, event detection infrastructure 103 can receive normalized signal 122A. Method 300 includes deriving second one or more features of the second signal (305). For example, event detection infrastructure 103 can derive features 202 of normalized signal 122A. Features 202 can include and/or be derived from time 123A, location 124A, context 126A, content 127A, type 128A, and source 129A. Event detection infrastructure 103 can also derive features 202 from one or more single source probabilities assigned to normalized signal 122A.

Method 300 includes aggregating the first one or more features with the second one or more features into aggregated features (306). For example, evaluation module 206 can aggregate features 201 with features 202 into aggregated features 203. Evaluation module 206 can include an algorithm that defines and aggregates individual contributions of different signal features into aggregated features. Aggregating features 201 and 202 can include aggregating a single source probability assigned to normalized signal 122B for an event type with a signal source probability assigned to normalized signal 122A for the event type into a multisource probability for the event type.

Method 300 includes detecting an event from the aggregated features (307). For example, evaluation module 206 can determine that aggregated features 203 satisfy conditions to be detected as an event. Evaluation module 206 can detect event 224, such as, for example, a fire, an accident, a shooting, a protest, etc. based on satisfaction of the conditions.

In one aspect, conditions for event identification can be included in thresholds 226. Conditions can include threshold probabilities per event type. When a probability exceeds a threshold probability, evaluation module 106 can detect an event. A probability can be a single signal probability or a multisource (aggregated) probability. As such, evaluation module 206 can detect an event based on a multisource probability exceeding a probability threshold in thresholds 226.

Figure 4:
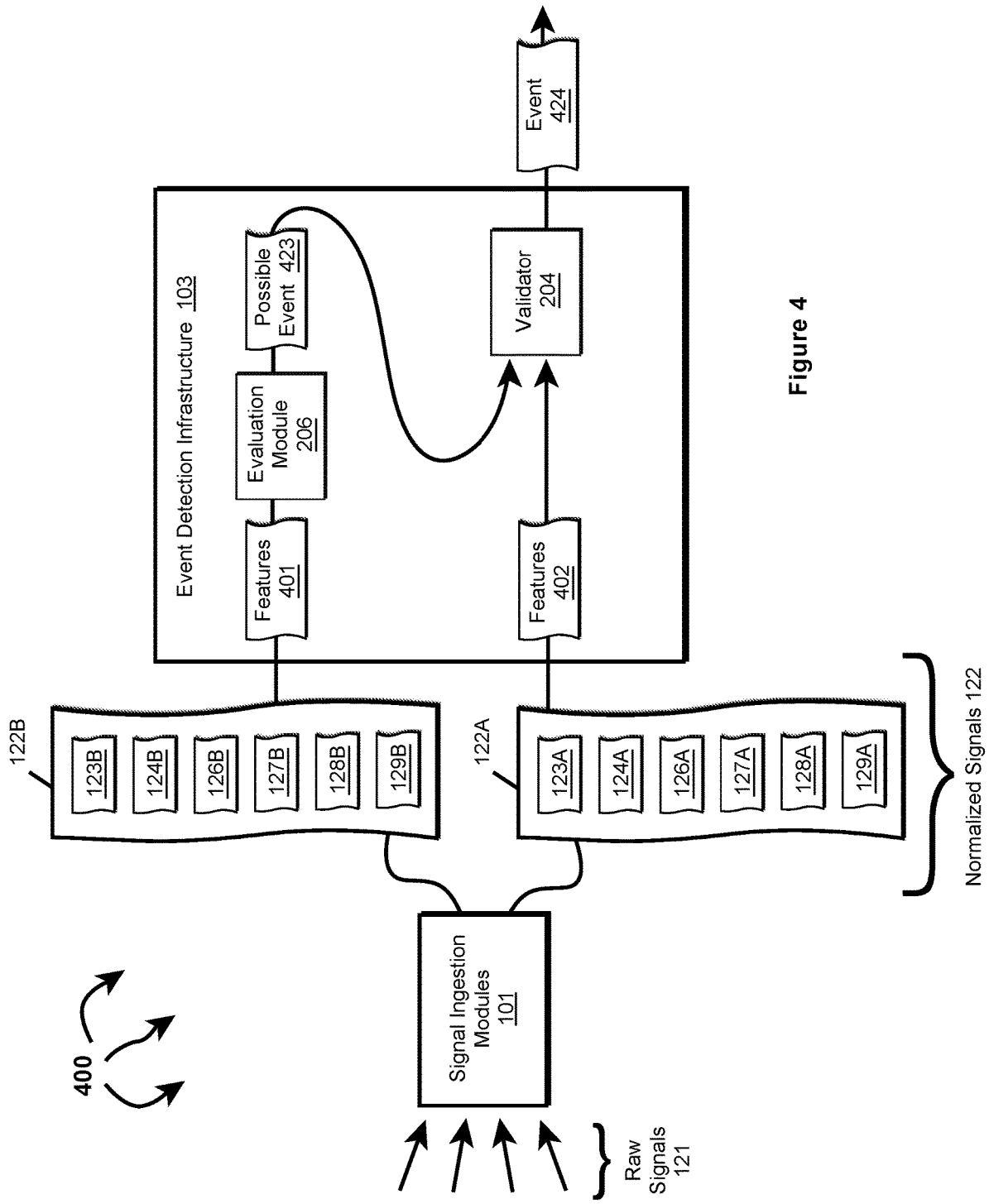
FIG. 4 illustrates an example computer architecture that facilitates detecting an event from features derived from multiple signals.

FIG. 4 illustrates an example computer architecture 400 that facilitates detecting an event from features derived from multiple signals. As depicted, event detection infrastructure 103 further includes evaluation module 206 and validator 204. Evaluation module 206 is configured to determine if features of a plurality of normalized signals indicate a possible event. Evaluation module 206 can detect (or not detect) a possible event based on one or more features of a normalized signal. Validator 204 is configured to validate (or not validate) a possible event as an actual event based on one or more features of another normalized signal.

FIG. 5 illustrates a flow chart of an example method 500 for detecting an event from features derived from multiple signals. Method 500 will be described with respect to the components and data in computer architecture 400.

Method 500 includes receiving a first signal (501). For example, event detection infrastructure 103 can receive normalized signal 122B. Method 500 includes deriving first one or more features of the first signal (502). For example, event detection infrastructure 103 can derive features 401 of normalized signal 122B. Features 401 can include and/or be derived from time 123B, location 124B, context 126B, content 127B, type 128B, and source 129B. Event detection infrastructure 103 can also derive features 401 from one or more single source probabilities assigned to normalized signal 122B.

Method 500 includes detecting a possible event from the first one or more features (503). For example, evaluation module 206 can detect possible event 423 from features 401. Based on features 401, event detection infrastructure 103 can determine that the evidence in features 401 is not confirming of an event but is sufficient to warrant further investigation of an event type. In one aspect, a single source probability assigned to normalized signal 122B for an event type does not satisfy a probability threshold for full event detection but does satisfy a probability threshold for further investigation.

Method 500 includes receiving a second signal (504). For example, event detection infrastructure 103 can receive normalized signal 122A. Method 500 includes deriving second one or more features of the second signal (505). For example, event detection infrastructure 103 can derive features 402 of normalized signal 122A. Features 402 can include and/or be derived from time 123A, location 124A, context 126A, content 127A, type 128A, and source 129A. Event detection infrastructure 103 can also derive features 402 from one or more single source probabilities assigned to normalized signal 122A.

Method 500 includes validating the possible event as an actual event based on the second one or more features (506). For example, validator 204 can determine that possible event 423 in combination with features 402 provide sufficient evidence of an actual event. Validator 204 can validate possible event 423 as event 424 based on features 402. In one aspect, validator 204 considers a single source probability assigned to normalized signal 122B in view of a single source probability assigned to normalized signal 122B. Validator 204 determines that the signal source probabilities, when considered collectively satisfy a probability threshold for detecting an event.

Forming and Detecting Events from Signal Groupings

In general, a plurality of normalized (e.g., TLC) signals can be grouped together in a signal group based on spatial similarity and/or temporal similarity among the plurality of normalized signals and/or corresponding raw (non-normalized) signals. A feature extractor can derive features (e.g., percentages, counts, durations, histograms, etc.) of the signal group from the plurality of normalized signals. An event detector can attempt to detect events from signal group features.

Figure 6A:
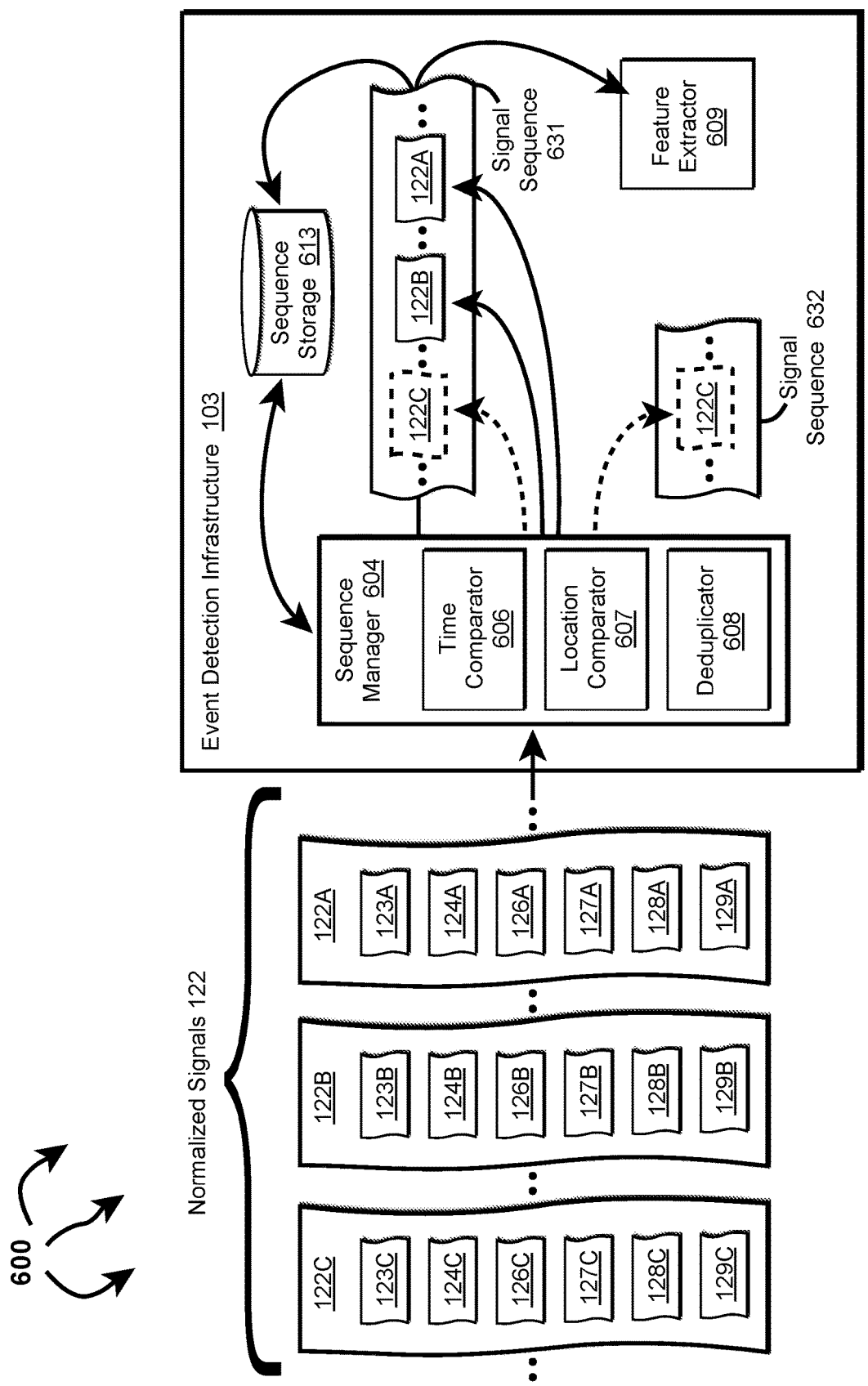
FIG. 6A illustrates an example computer architecture that facilitates forming a signal sequence.

In one aspect, a plurality of normalized (e.g., TLC) signals are included in a signal sequence. Turning to FIG. 6A, event detection infrastructure 103 can include sequence manager 604, feature extractor 609, and sequence storage 613. Sequence manager 604 further includes time comparator 606, location comparator 607, and deduplicator 608.

Time comparator 606 is configured to determine temporal similarity between a normalized signal and a signal sequence. Time comparator 606 can compare a signal time of a received normalized signal to a time associated with existing signal sequences (e.g., the time of the first signal in the signal sequence). Temporal similarity can be defined by a specified time period, such as, for example, 5 minutes, 10 minutes, 20 minutes, 30 minutes, etc. When a normalized signal is received within the specified time period of a time associated with a signal sequence, the normalized signal can be considered temporally similar to signal sequence.

Likewise, location comparator 607 is configured to determine spatial similarity between a normalized signal and a signal sequence. Location comparator 607 can compare a signal location of a received normalized signal to a location associated with existing signal sequences (e.g., the location of the first signal in the signal sequence). Spatial similarity can be defined by a geographic area, such as, for example, a distance radius (e.g., meters, miles, etc.), a number of geo cells of a specified precision, an Area of Interest (AoI), etc. When a normalized signal is received within the geographic area associated with a signal sequence, the normalized signal can be considered spatially similar to signal sequence.

Deduplicator 608 is configured to determine if a signal is a duplicate of a previously received signal. Deduplicator 608 can detect a duplicate when a normalized signal includes content (e.g., text, image, etc.) that is essentially identical to previously received content (previously received text, a previously received image, etc.). Deduplicator 608 can also detect a duplicate when a normalized signal is a repost or rebroadcast of a previously received normalized signal. Sequence manager 604 can ignore duplicate normalized signals.

Sequence manager 604 can include a signal having sufficient temporal and spatial similarity to a signal sequence (and that is not a duplicate) in that signal sequence. Sequence manager 604 can include a signal that lacks sufficient temporal and/or spatial similarity to any signal sequence (and that is not a duplicate) in a new signal sequence. A signal can be encoded into a signal sequence as a vector using any of a variety of algorithms including recurrent neural networks (RNN) (Long Short Term Memory (LSTM) networks and Gated Recurrent Units (GRUs)), convolutional neural networks, or other algorithms.

Feature extractor 609 is configured to derive features of a signal sequence from signal data contained in the signal sequence. Derived features can include a percentage of normalized signals per geohash, a count of signals per time of day (hours:minutes), a signal gap histogram indicating a history of signal gap lengths (e.g., with bins for 1 s, 5 s, 10 s, 1 m, 5 m, 10 m, 30 m), a count of signals per signal source, model output histograms indicating model scores, a sequent duration, count of signals per signal type, a number of unique users that posted social content, etc. However, feature extractor 609 can derive a variety of other features as well. Additionally, the described features can be of different shapes to include more or less information, such as, for example, gap lengths, provider signal counts, histogram bins, sequence durations, category counts, etc.

Figure 7:
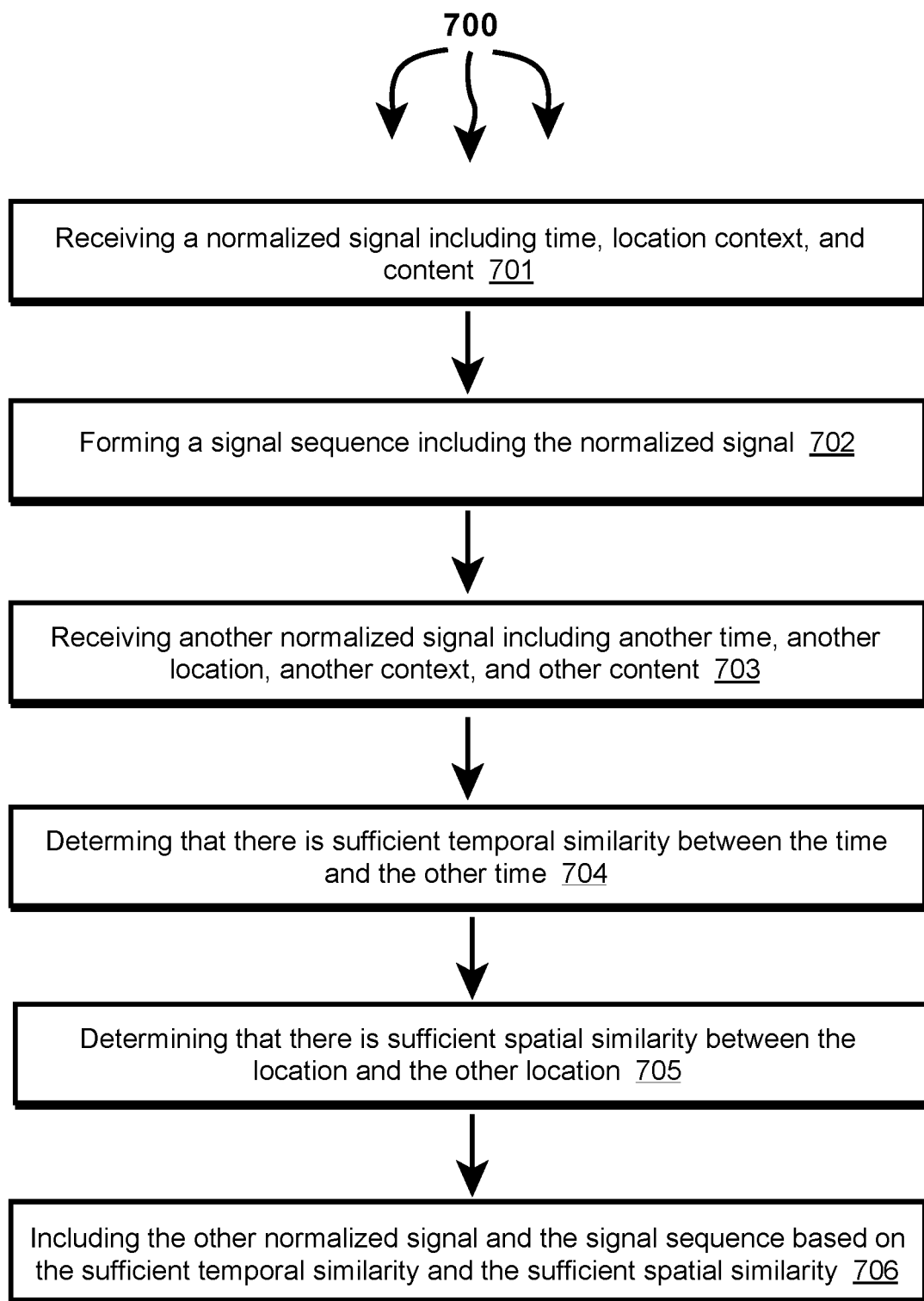
FIG. 7 illustrates a flow chart of an example method for forming a signal sequence.

FIG. 7 illustrates a flow chart of an example method 700 for forming a signal sequence. Method 700 will be described with respect to the components and data in computer architecture 600.

Method 700 includes receiving a normalized signal including time, location, context, and content (701). For example, sequence manager 604 can receive normalized signal 622A. Method 700 includes forming a signal sequence including the normalized signal (702). For example, time comparator 606 can compare time 623A to times associated with existing signal sequences. Similarly, location comparator 607 can compare location 124A to locations associated with existing signal sequences. Time comparator 606 and/or location comparator 607 can determine that normalized signal 122A lacks sufficient temporal similarity and/or lacks sufficient spatial similarity respectively to existing signal sequences. Deduplicator 608 can determine that normalized signal 122A is not a duplicate normalized signal. As such, sequence manager 604 can form signal sequence 631, include normalized signal 122A in signal sequence 631, and store signal sequence 631 in sequence storage 613.

Method 700 includes receiving another normalized signal including another time, another location, another context, and other content (703). For example, sequence manager 604 can receive normalized signal 622B.

Method 700 includes determining that there is sufficient temporal similarity between the time and the other time (704). For example, time comparator 606 can compare time 123B to time 123A. Time comparator 606 can determine that time 123B is sufficiently similar to time 123A. Method 700 includes determining that there is sufficient spatial similarity between the location and the other location (705). For example, location comparator 607 can compare location 124B to location 124A. Location comparator 607 can determine that location 124B has sufficient similarity to location 124A.

Method 700 includes including the other normalized signal in the signal sequence based on the sufficient temporal similarity and the sufficient spatial similarity (706). For example, sequence manager 604 can include normalized signal 124B in signal sequence 631 and update signal sequence 631 in sequence storage 613.

Subsequently, sequence manager 604 can receive normalized signal 122C. Time comparator 606 can compare time 123C to time 123A and location comparator 607 can compare location 124C to location 124A. If there is sufficient temporal and spatial similarity between normalized signal 122C and normalized signal 122A, sequence manager 604 can include normalized signal 122C in signal sequence 631. On the other hand, if there is insufficient temporal similarity and/or insufficient spatial similarity between normalized signal 122C and normalized signal 122A, sequence manager 604 can form signal sequence 632. Sequence manager 604 can include normalized signal 122C in signal sequence 632 and store signal sequence 631 in sequence storage 613.

Figure 6B:
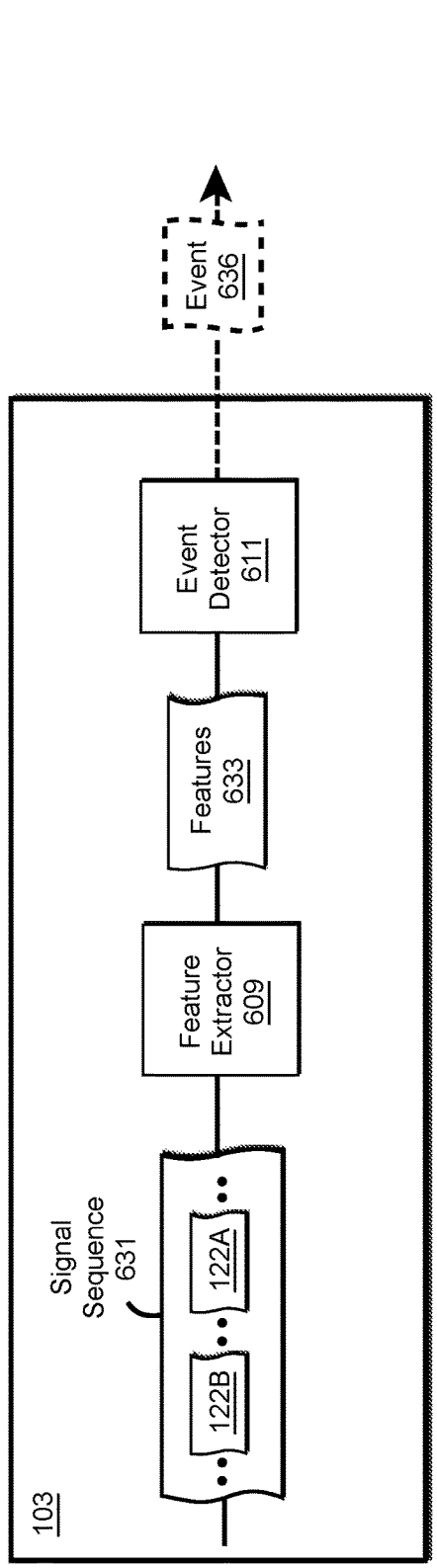
FIG. 6B illustrates an example computer architecture that facilitates detecting an event from features of a signal sequence.

Turning to FIG. 6B, event detection infrastructure 103 further includes event detector 611. Event detector 611 is configured to determine if features extracted from a signal sequence are indicative of an event.

Figure 8:
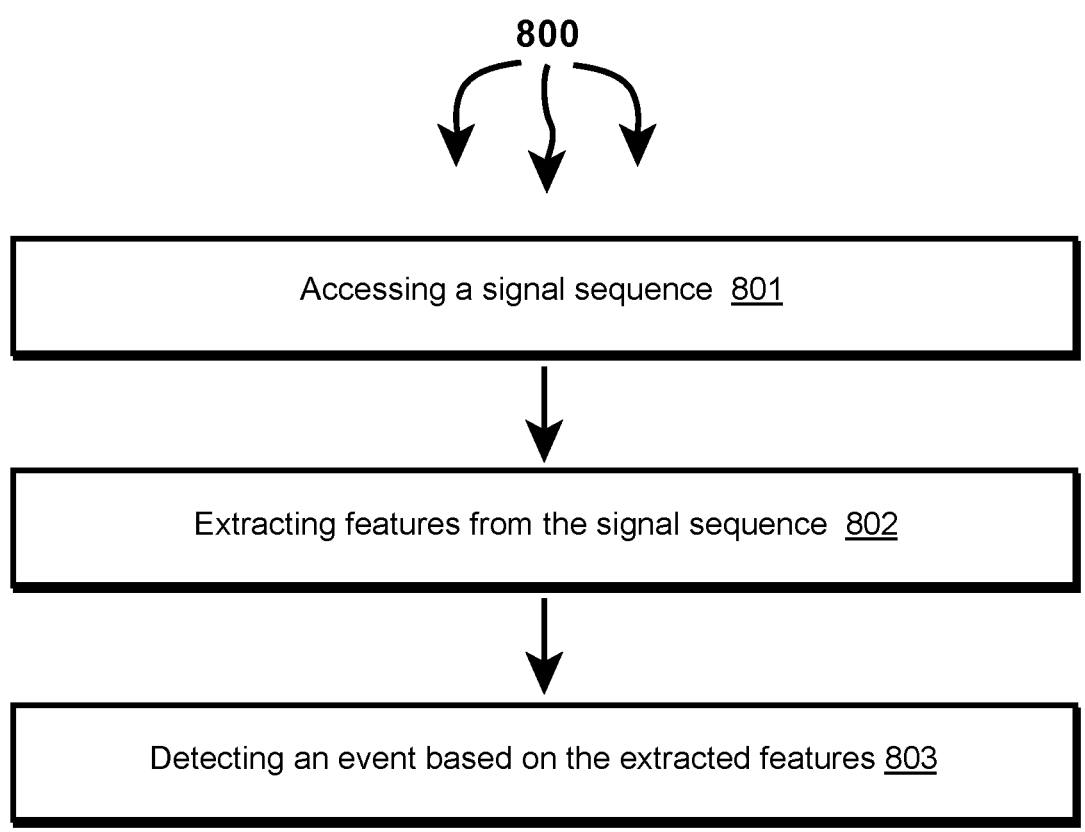
FIG. 8 illustrates a flow of an example method for detecting an event from a signal sequence.

FIG. 8 illustrates a flow chart of an example method 800 for detecting an event. Method 800 will be described with respect to the components and data in computer architecture 600.

Method 800 includes accessing a signal sequence (801). For example, feature extractor 609 can access signal sequence 631. Method 800 includes extracting features from the signal sequence (802). For example, feature extractor 609 can extract features 633 from signal sequence 631. Method 800 includes detecting an event based on the extracted features (803). For example, event detector 611 can attempt to detect an event from features 633. In one aspect, event detector 611 detects event 636 from features 633. In another aspect, event detector 611 does not detect an event from features 633.

Figure 6C:
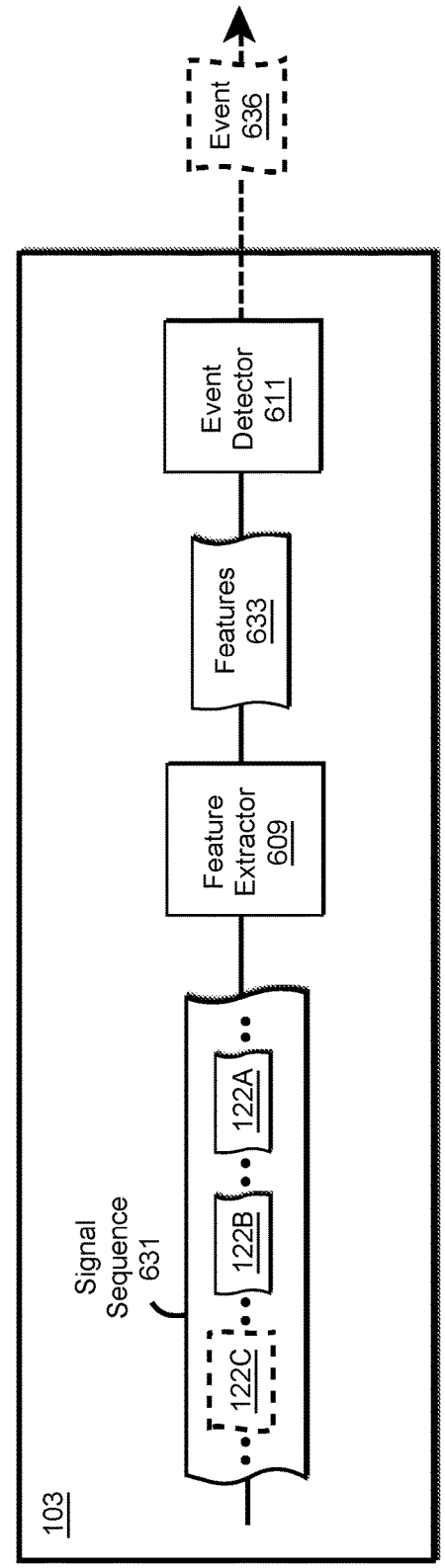
FIG. 6C illustrates an example computer architecture that facilitates detecting an event from features of a signal sequence.

Turning to FIG. 6C, sequence manager 604 can subsequently add normalized signal 122C to signal sequence 631 changing the signal data contained in signal sequence 631. Feature extractor 609 can again access signal sequence 631. Feature extractor 609 can derive features 634 (which differ from features 633 at least due to inclusion of normalized signal 122C) from signal sequence 631. Event detector 611 can attempt to detect an event from features 634. In one aspect, event detector 611 detects event 636 from features 634. In another aspect, event detector 611 does not detect an event from features 634.

In a more specific aspect, event detector 611 does not detect an event from features 633. Subsequently, event detector 611 detects event 636 from features 634.

An event detection can include one or more of a detection identifier, a sequence identifier, and an event type (e.g., accident, hazard, fire, traffic, weather, etc.).

A detection identifier can include a description and features. The description can be a hash of the signal with the earliest timestamp in a signal sequence. Features can include features of the signal sequence. Including features provides understanding of how a multisource detection evolves over time as normalized signals are added. A detection identifier can be shared by multiple detections derived from the same signal sequence.

A sequence identifier can include a description and features. The description can be a hash of all the signals included in the signal sequence. Features can include features of the signal sequence. Including features permits multisource detections to be linked to human event curations. A sequence identifier can be unique to a group of signals included in a signal sequence. When signals in a signal sequence change (e.g., when a new normalized signal is added), the sequence identifier is changed.

In one aspect, event detection infrastructure 103 also includes one or more multisource classifiers. Feature extractor 609 can send extracted features to the one or more multisource classifiers. Per event type, the one or more multisource classifiers compute a probability (e.g., using artificial intelligence, machine learning, neural networks, etc.) that the extracted features indicate the type of event. Event detector 611 can detect (or not detect) an event from the computed probabilities.

Figure 6D:
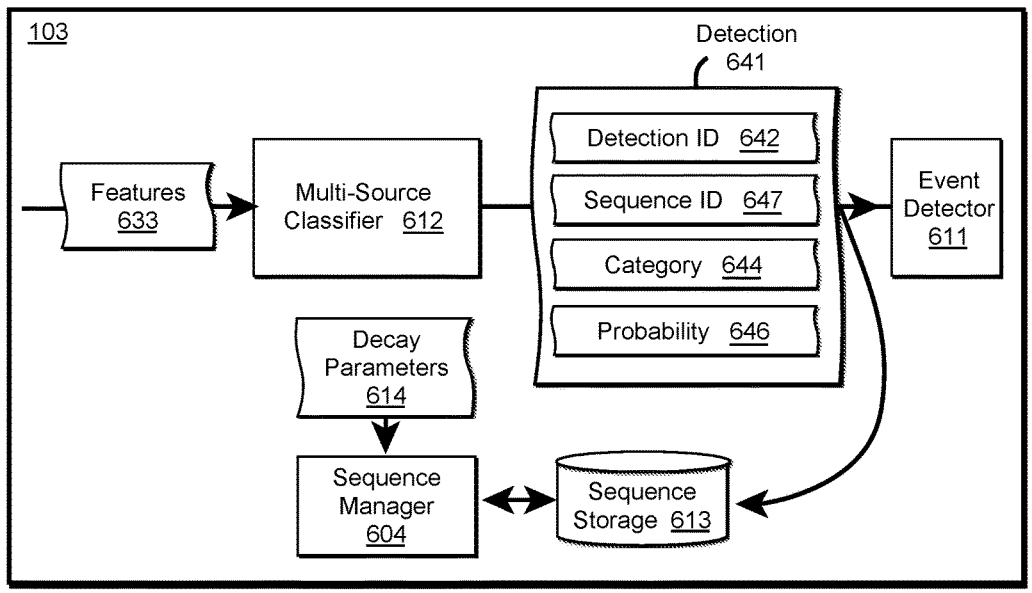
FIG. 6D illustrates an example computer architecture that facilitates detecting an event from a multisource probability.

For example, turning to FIG. 6D, multi-source classifier 612 is configured to assign a probability that a signal sequence is a type of event. Multi-source classifier 612 formulate a detection from signal sequence features. Multi-source classifier 612 can implement any of a variety of algorithms including: logistic regression, random forest (RF), support vector machines (SVM), gradient boosting (GBDT), linear, regression, etc.

For example, multi-source classifier 612 (e.g., using machine learning, artificial intelligence, neural networks, etc.) can formulate detection 641 from features 633. As depicted, detection 641 includes detection ID 642, sequence ID 643, category 644, and probability 646. Detection 641 can be forwarded to event detector 611. Event detector 611 can determine that probability 646 does not satisfy a detection threshold for category 644 to be indicated as an event. Detection 641 can also be stored in sequence storage 613.

Subsequently, turning to FIG. 6E, multi-source classifier 612 (e.g., using machine learning, artificial intelligence, neural networks, etc.) can formulate detection 651 from features 634. As depicted, detection 651 includes detection ID 642, sequence ID 647, category 644, and probability 648. Detection 651 can be forwarded to event detector 611. Event detector 611 can determine that probability 648 does satisfy a detection threshold for category 644 to be indicated as an event. Detection 641 can also be stored in sequence storage 613. Event detector 611 can output event 636.

As detections age and are not determined to be accurate (i.e., are not True Positives), the probability declines that signals are "True Positive" detections of actual events. As such, a multi-source probability for a signal sequence, up to the last available signal, can be decayed over time. When a new signal comes in, the signal sequence can be extended by the new signal. The multi-source probability is recalculated for the new, extended signal sequence, and decay begins again.

In general, decay can also be calculated "ahead of time" when a detection is created and a probability assigned. By pre-calculating decay for future points in time, downstream systems do not have to perform calculations to update decayed probabilities. Further, different event classes can decay at different rates. For example, a fire detection can decay more slowly than a crash detection because these types of events tend to resolve at different speeds. If a new signal is added to update a sequence, the pre-calculated decay values may be discarded. A multi-source probability can be re-calculated for the updated sequence and new pre-calculated decay values can be assigned.

Multi-source probability decay can start after a specified period of time (e.g., 3 minutes) and decay can occur in accordance with a defined decay equation. Thus, modeling multi-source probability decay can include an initial static phase, a decay phase, and a final static phase. In one aspect, decay is initially more pronounced and then weakens. Thus, as a newer detection begins to age (e.g., by one minute) it is more indicative of a possible "false positive" relative to an older event that ages by an additional minute.

In one aspect, a decay equation defines exponential decay of multi-source probabilities. Different decay rates can be used for different classes. Decay can be similar to radioactive decay, with different tau values used to calculate the "half life" of multi-source probability for a class. Tau values can vary by event type.

Figure 6E:
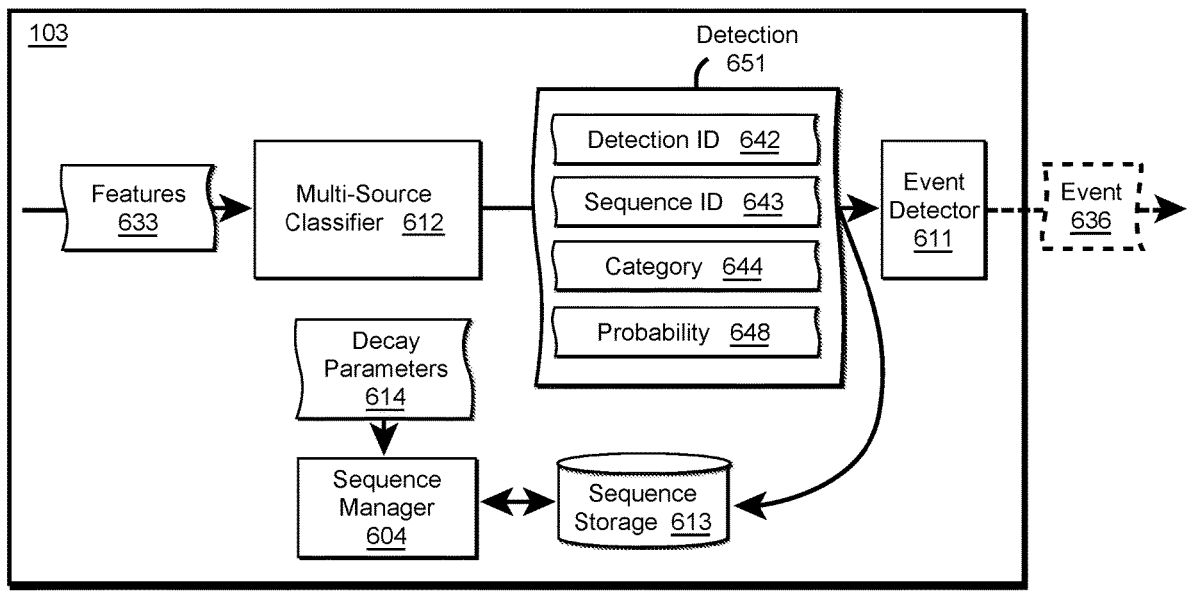
FIG. 6E illustrates an example computer architecture that facilitates detecting an event from a multisource probability.

In FIGS. 6D and 6E, decay for signal sequence 631 can be defined in decay parameters 114. Sequence manager 104 can decay multisource probabilities computed for signal sequence 631 in accordance with decay parameters 614.

The components and data depicted in FIGS. 1-8 can be integrated with and/or can interoperate with one another to detect events. For example, evaluation module 206 and/or validator 204 can include and/or interoperate with one or more of: a sequence manager, a feature extractor, multi-source classifiers, or an event detector.

Figure 9:
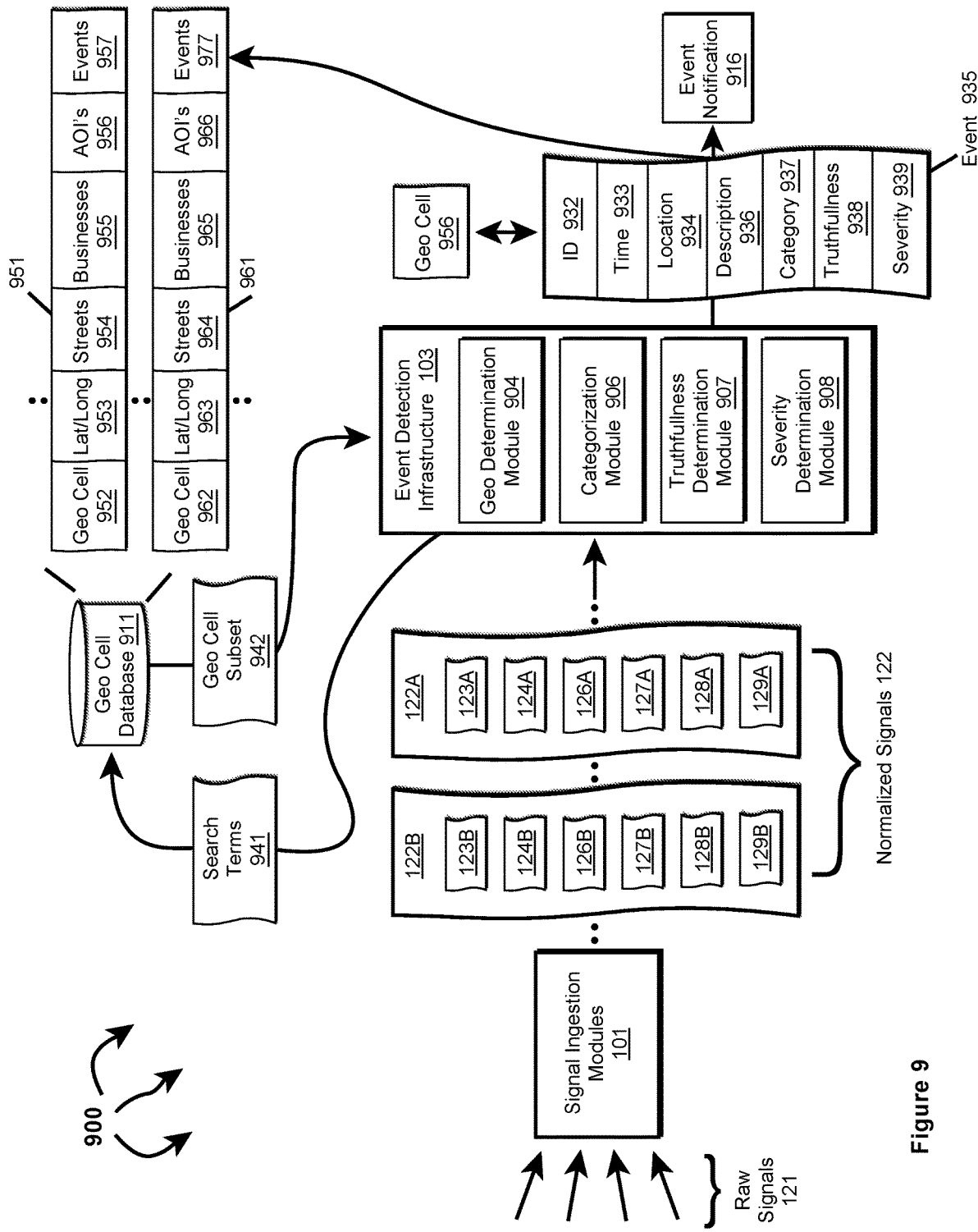
FIG. 9 illustrates an example computer architecture that facilitates detecting events.

FIG. 9 illustrates an example computer architecture 900 that facilitates detecting events. The components and data described with respect to FIGS. 1-8 can also be integrated with and/or can interoperate with the data and components of computer architecture 900 to detect events.

As depicted, computer architecture 900 includes geo cell database 911 and even notification 916. Geo cell database 911 and even notification 916 can be connected to (or be part of) a network with signal ingestion modules 101 and event detection infrastructure 103. As such, geo cell database 911 and even notification 916 can create and exchange message related data over the network.

As descried, in general, on an ongoing basis, concurrently with signal ingestion (and also essentially in real-time), event detection infrastructure 103 detects different categories of (planned and unplanned) events (e.g., fire, police response, mass shooting, traffic accident, natural disaster, storm, active shooter, concerts, protests, etc.) in different locations (e.g., anywhere across a geographic area, such as, the United States, a State, a defined area, an impacted area, an area defined by a geo cell, an address, etc.), at different times from time, location, and context included in normalized signals.

Event detection infrastructure 103 can also determine an event truthfulness, event severity, and an associated geo cell. In one aspect, context information in a normalized signal increases the efficiency of determining truthfulness, severity, and an associated geo cell.

Generally, an event truthfulness indicates how likely a detected event is actually an event (vs. a hoax, fake, misinterpreted, etc.). Truthfulness can range from less likely to be true to more likely to be true. In one aspect, truthfulness is represented as a numerical value, such as, for example, from 1 (less truthful) to 10 (more truthful) or as percentage value in a percentage range, such as, for example, from 0% (less truthful) to 100% (more truthful). Other truthfulness representations are also possible.

Generally, an event severity indicates how severe an event is (e.g., what degree of badness, what degree of damage, etc. is associated with the event). Severity can range from less severe (e.g., a single vehicle accident without injuries) to more severe (e.g., multi vehicle accident with multiple injuries and a possible fatality). As another example, a shooting event can also range from less severe (e.g., one victim without life threatening injuries) to more severe (e.g., multiple injuries and multiple fatalities). In one aspect, severity is represented as a numerical value, such as, for example, from 1 (less severe) to 5 (more severe). Other severity representations are also possible.

In general, event detection infrastructure 103 can include a geo determination module including modules for processing different kinds of content including location, time, context, text, images, audio, and video into search terms. The geo determination module can query a geo cell database with search terms formulated from normalized signal content. The geo cell database can return any geo cells having matching supplemental information. For example, if a search term includes a street name, a subset of one or more geo cells including the street name in supplemental information can be returned to the event detection infrastructure.

Event detection infrastructure 103 can use the subset of geo cells to determine a geo cell associated with an event location. Events associated with a geo cell can be stored back into an entry for the geo cell in the geo cell database. Thus, over time an historical progression of events within a geo cell can be accumulated.

As such, event detection infrastructure 103 can assign an event ID, an event time, an event location, an event category, an event description, an event truthfulness, and an event severity to each detected event. Detected events can be sent to relevant entities, including to mobile devices, to computer systems, to APIs, to data storage, etc.

As depicted in computer architecture 900, event detection infrastructure 103 detects events from information contained in normalized signals 122. Event detection infrastructure 103 can detect an event from a single normalized signal 122 or from multiple normalized signals 122. In one aspect, event detection infrastructure 103 detects an event based on information contained in one or more normalized signals 122. In another aspect, event detection infrastructure 103 detects a possible event based on information contained in one or more normalized signals 122. Event detection infrastructure 103 then validates the potential event as an event based on information contained in one or more other normalized signals 122.

As depicted, event detection infrastructure 103 includes geo determination module 904, categorization module 906, truthfulness determination module 907, and severity determination module 908.

Geo determination module 904 can include NLP modules, image analysis modules, etc. for identifying location information from a normalized signal. Geo determination module 904 can formulate (e.g., location) search terms 941 by using NLP modules to process audio, using image analysis modules to process images, etc. Search terms can include street addresses, building names, landmark names, location names, school names, image fingerprints, etc. Event detection infrastructure 103 can use a URL or identifier to access cached content when appropriate.

Categorization module 906 can categorize a detected event into one of a plurality of different categories (e.g., fire, police response, mass shooting, traffic accident, natural disaster, storm, active shooter, concerts, protests, etc.) based on the content of normalized signals used to detect and/or otherwise related to an event.

Truthfulness determination module 907 can determine the truthfulness of a detected event based on one or more of: source, type, age, and content of normalized signals used to detect and/or otherwise related to the event. Some signal types may be inherently more reliable than other signal types. For example, video from a live traffic camera feed may be more reliable than text in a social media post. Some signal sources may be inherently more reliable than others. For example, a social media account of a government agency may be more reliable than a social media account of an individual. The reliability of a signal can decay over time.

Severity determination module 908 can determine the severity of a detected event based on or more of: location, content (e.g., dispatch codes, keywords, etc.), and volume of normalized signals used to detect and/or otherwise related to an event. Events at some locations may be inherently more severe than events at other locations. For example, an event at a hospital is potentially more severe than the same event at an abandoned warehouse. Event category can also be considered when determining severity. For example, an event categorized as a "Shooting" may be inherently more severe than an event categorized as "Police Presence" since a shooting implies that someone has been injured.

Geo cell database 911 includes a plurality of geo cell entries. Each geo cell entry includes a geo cell defining an area and corresponding supplemental information about things included in the defined area. The corresponding supplemental information can include latitude/longitude, street names in the area defined by the geo cell, businesses in the area defined by the geo cell, other Areas of Interest (AOIs) (e.g., event venues, such as, arenas, stadiums, theaters, concert halls, etc.) in the area defined by the geo cell, image fingerprints derived from images captured in the area defined by the geo cell, and prior events that have occurred in the area defined by the geo cell. For example, geo cell entry 951 includes geo cell 952, lat/lon 953, streets 954, businesses 955, AOIs 956, and prior events 957. Each event in prior events 957 can include a location (e.g., a street address), a time (event occurrence time), an event category, an event truthfulness, an event severity, and an event description. Similarly, geo cell entry 961 includes geo cell 962, lat/lon 963, streets 964, businesses 965, AOIs 966, and prior events 967. Each event in prior events 967 can include a location (e.g., a street address), a time (event occurrence time), an event category, an event truthfulness, an event severity, and an event description.

Other geo cell entries can include the same or different (more or less) supplemental information, for example, depending on infrastructure density in an area. For example, a geo cell entry for an urban area can contain more diverse supplemental information than a geo cell entry for an agricultural area (e.g., in an empty field).

Geo cell database 911 can store geo cell entries in a hierarchical arrangement based on geo cell precision. As such, geo cell information of more precise geo cells is included in the geo cell information for any less precise geo cells that include the more precise geo cell.

Geo determination module 904 can query geo cell database 911 with search terms 941. Geo cell database 911 can identify any geo cells having supplemental information that matches search terms 941. For example, if search terms 141 include a street address and a business name, geo cell database 911 can identify geo cells having the street name and business name in the area defined by the geo cell. Geo cell database 911 can return any identified geo cells to geo determination module 904 in geo cell subset 942.

Geo determination module can use geo cell subset 942 to determine the location of event 935 and/or a geo cell associated with event 935. As depicted, event 935 includes event ID 932, time 933, location 934, description 936, category 937, truthfulness 938, and severity 939.

Event detection infrastructure 103 can also determine that event 935 occurred in an area defined by geo cell 962 (e.g., a geohash having precision of level 7 or level 9). For example, event detection infrastructure 103 can determine that location 934 is in the area defined by geo cell 962. As such, event detection infrastructure 903 can store event 935 in events 967 (i.e., historical events that have occurred in the area defined by geo cell 962).

Event detection infrastructure 103 can also send event 935 to event notification module 916. Event notification module 916 can notify one or more entities about event 134.

Detecting Events Based on Private Signals and/or Non-Private Signals

Many organizations (e.g., governments, businesses, etc.) have a variety of different types of data managed by different organizational units (e.g., agencies, bureaus, departments, etc.) Within an organization, data can be in disparate data formats and data managed by different organizational units can be siloed from one another. For example, a municipality may have a number of different and disconnected IT systems that store department specific data, such as, for example, sewer and water data, IoT sensor data from city vehicles, business registries, building permit data, 911 call data, school data, hazardous material storage information, etc.

It can be difficult and inefficient to derive intelligence from organization wide data analysis when organizational data is siloed. Some organizational units within an organization may not know that various types of data managed by other organizational units even exist. For example, when a fire occurs it may be time consuming to determine if the fire is near any businesses that use or store hazardous materials.

Organizational data can be also be useful when attempting to identify events of relevance to an organization or of relevance to others. For example, entities, such as, parents, guardians, teachers, social workers, first responders, hospitals, delivery services, media outlets, government entities, may desire to be made aware of relevant events as close as possible to the events' occurrence (i.e., as close as possible to "moment zero"). However, since organization data is siloed and stored in disparate formats, it can be difficult and/or inefficient to use organizational data in an event detection capacity. Many organizations viewing combining/integrating different data formats from different silos as an insurmountable problem. As such, organizations typically avoid data analysis and decision making that would require collectively considering data from disparate and siloed sources.

Generally, handling different types and formats of data introduces inefficiencies into data interactions and event detection processes, including when determining if different signals relate to the same event.

Many organizations also generate and/or maintain varied (and often significant) amounts of private data. An organization may limit access to private data and/or intelligence derived from the private data to units within the organization. In other aspects, an organization may limit access to private data and/or derived intelligence to other specified entities/organizations outside of the organization (and without making the private data and/or derived intelligence available to the general public). For example, an organization may have an information sharing agreement with another entity/organization, an organization may share with another organization to facilitate public safety, etc.

Aspects of the invention ingest different (disparate) types of signals (e.g., database signals, application signals, social media signals, web signals, and streaming signals) from different organizations as well as from different silos within an organization. Ingested signals are normalized into a common format that includes Time, Location, and Context (TLC). Per signal type, ingestion modules identify a time, a location, and a context associated with a signal. Different ingestion modules can be utilized/tailored to identify time, location, and context for different signal types. Normalized signals can be forwarded to a user interface, to data analysis modules, to an event detection infrastructure.

Different types of signals can include different data types, different data formats originating from different organizations or different silos within the same organization. Data types can include audio, video, image, text, other binary types, (e.g., database formats), and sensor output formats (switch activations, trends, anomalies, etc.). Different formats can include text in XML, text in JavaScript Object Notation (JSON), text in RSS feed, plain text, video stream in Dynamic Adaptive Streaming over HTTP (DASH), video stream in HTTP Live Streaming (HLS), video stream in Real-Time Messaging Protocol (RTMP), etc.

Signals are normalized into a common format increasing efficiency of subsequent data processing.

Disparate data/signals from different silos of an organization can be aggregated through signal normalization. Data ingestion modules can send aggregated normalized signals to data analysis modules, user interfaces, event detection infrastructures, etc.

In this description and the following claims, a "private" signal (or "private" data) is defined as a signal (or data) associated with (e.g., originating within an) organization that is not shareable outside the organization (although may be shared between sub units of the organization, for example, to compensate for siloed data). A private signal (or private data) may be private because the signal (or data) was initially created to be private (e.g., law enforcement investigative data) or because an organization's privacy settings were adjusted (e.g., changed from public or non-private to private).

In this description and the following claims, a "non-private" signal (or "non-private" data) is defined as a signal (or data) associated with an organization that, for example, through agreement, is shareable with one or more other entities and/or one or more other organizations (as well as shareable within the organization) but that is not publicly shared. For example, a municipal law enforcement agency may agree to share a data type/signal type with a state law enforcement agency and/or a corresponding municipal fire department. However, the municipal law enforcement agency does not share the data type/signal type with the general public. A non-private signal (or non-private data) may be non-private because the signal (or data) was initially created to be non-private or because an organization's privacy settings were adjusted (e.g., changed from private or public to non-private). Non-private signals and non-private data can be associated with a list of other entities and/or organizations permitted to access the non-private signals and non-private data.

In this description and the following claims, a "non-public" signal (or "non-public data") is defined to have essentially the same meaning as a non-private signal (or non-private data).

In this description and the following claims, a "semi-public" signal (or "semi-public" data) is defined to have essentially the same meaning as a non-private signal (or non-private data).

In this description and the following claims, a "public" signal (or "public" data) is a signal (or data) accessible to the general public. A public signal (or public data) may be public because the signal (or data) was initially created to be public (e.g., a social media post) or because an organization's privacy settings were adjusted (e.g., changed from private or non-private to public). Social signals 171, web signals 172, and streaming signals 173 are examples of public signals.

Depending on selected data privacy settings, an organization may or may not permit its data to be accessible and/or aggregated (combined) with data from other organizations and/or to be accessible and/or combined with public data (e.g., to more accurately identify events if interest). For example, an organization may select data privacy settings so that their data is not accessible to and/or aggregatable (combinable) with any other data. On the other hand, an organization may select data privacy settings permitting their data to be accessed by and/or aggregated (combined) with data from one or more other organizations. In a further aspect, an organization may select data privacy settings permitting their data to be publicly accessed and/or aggregated (combined) with public data.

Data privacy settings can also be configured separately and/or differently for data aggregation and for data access. For example, an organization can configure data privacy settings to allow its signals/data to be aggregated (or combined) with other non-private signals/data and/or public signals/data. However, the organization may limit access to aggregated (or combined) signals/data or intelligence derived therefrom (e.g., detected events) to the organization (or sub units thereof). On the other hand, an organization can configure data privacy settings to prevent its signals/data from being aggregated (or combined) with other non-private signals/data and/or public signals/data. However, the organization may allow aggregated (or combined) private signals or intelligence derived therefrom (e.g., detected events) to be accessed by other entities and/or organizations.

According, using data privacy settings, an organization can define their signals/data as private for purposes of data aggregation (or combination) and as private for purposes of data access or vice versa. In other aspects, using data privacy settings, an organization can define their signals/data as private for purposes of data aggregation (or combination) and as non-private for purposes of data access or vice versa. In further aspects, using data privacy settings, an organization can define their signals/data as non-private for purposes of data aggregation (or combination) and as public for purposes of data access or vice versa. In additional aspects, using data privacy settings, an organization can define their signals/data as non-private for purposes of data aggregation (or combination) and as non-private for purposes of data access or vice versa.

Any signals/data defined as non-private can be associated with a list defining entities and/or other organizations authorized (or expressly not permitted) to aggregate (or combine) with an organization's data and/or access an organization's data. In one aspect, an organization defines a list of entities and/or other organizations authorized for both aggregation and access. In another aspect, an organization defines one list of entities and/or other organizations authorized for aggregation and defines another separate list of different entities and/or other organizations authorized for access.

In additional aspects, using data privacy settings, an organization can define their signals/data as public for purposes of data aggregation (or combination) and as public for purposes of data access or vice versa.

Default behavior associated with data aggregation (combination) and/or data access can vary. In one aspect, an organization's signals/data are private by default. The organization can define data privacy settings to make the signals/data non-private or public. In another aspect, an organization's signals/data are public by default. The organization can define data privacy setting to make the signals/data private or non-private. Default behavior associated with data aggregation (combination) and data access may be the same or may differ.

In one aspect, aggregated normalized data is sent to data analysis modules. The data analysis modules analyze the aggregated data. Analyzing the aggregated data provides increased intelligence to the organization relative to individually analyzing data from different silos.

In another aspect, aggregated normalized data is sent to a unifying user interface for presentation. The unifying user interface presents the aggregated normalized data. Presenting aggregated normalized data provides an organization with more information relative to individually presenting data from different silos. A unifying user interface and data analysis modules can interoperate, permitting an organization to switch between different data views (e.g., map and list), drill down into data for further details, etc.

In a further aspect, aggregated normalized data is sent to an event detection infrastructure (e.g., event detection infrastructure 903). On an ongoing basis, concurrently with data ingestion (and also essentially in real-time), the event detection infrastructure detects different categories of events (e.g., fire, police response, mass shooting, traffic accident, natural disaster, storm, active shooter, concerts, protests, etc.) in different locations (e.g., anywhere across a geographic area, such as, the United States, a State, a defined area, an impacted area, an area defined by a geohash, an address, etc.), at different times from time, location, and context included in normalized signals.

As described, events can be detected from a single normalized signal or from a plurality of normalized signals. In one aspect, one or more of an organization's private data/private raw signals are normalized into one or more corresponding private normalized signals. An event is detected based on the content of the one or more private normalized signals. In another aspect, a potential event is detected based on the content of one or more normalized signals and then validated as an event based on the content of one or more other normalized other signals. The one or more normalized signals and/or the one or more other normalized signals can include private normalized signals.

When an event is detected and/or validated using private normalized signals, propagation of information related to the event can be limited to an organization associated with the private normalized signals (or subunits thereof).

In further aspect, one or more non-private raw signals are normalized into one or more corresponding non-private normalized signals. An event is detected based on the content of the one or more non-private normalized signals. In an additional aspect, a potential event is detected based on the content of one or more normalized signals and then validated as an event based on the content of one or more other normalized other signals. The one or more normalized signals and/or the one or more other normalized signals can include non-private normalized signals. When an event is detected and/or validated using non-private normalized signals, propagation of information related to the event can be limited to entities and/or organizations with which the non-private normalized signals are shareable.

As described, an event detection infrastructure (e.g., event detection infrastructure 903) can also determine an event truthfulness, event severity, and location (e.g., associated geo cell). In one aspect, context information in a normalized signal increases the efficiency of determining truthfulness, severity, and location.

Figure 10A:
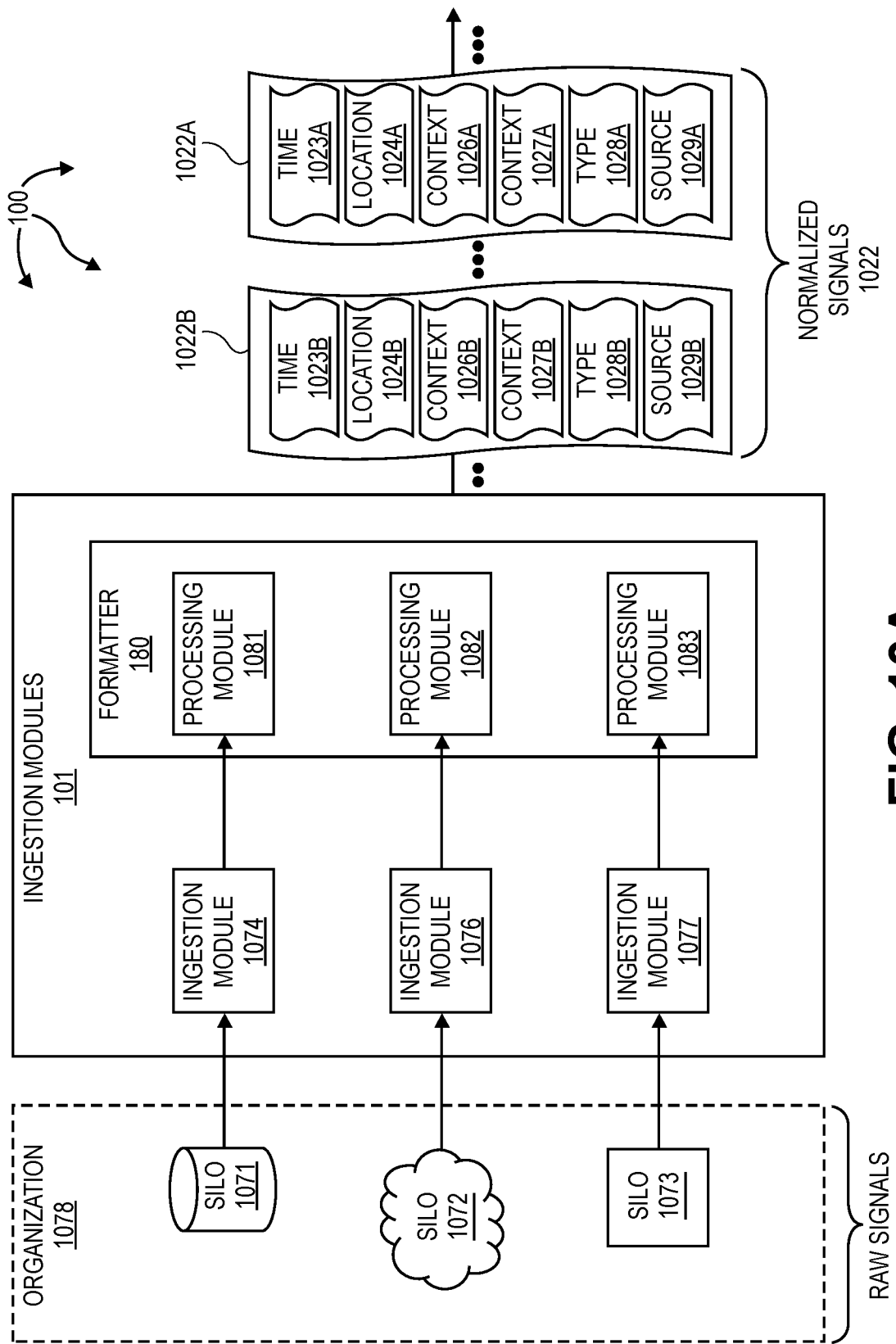
FIG. 10A illustrates an example computer architecture that facilitates ingesting signals from an organization.
Figure 10B:
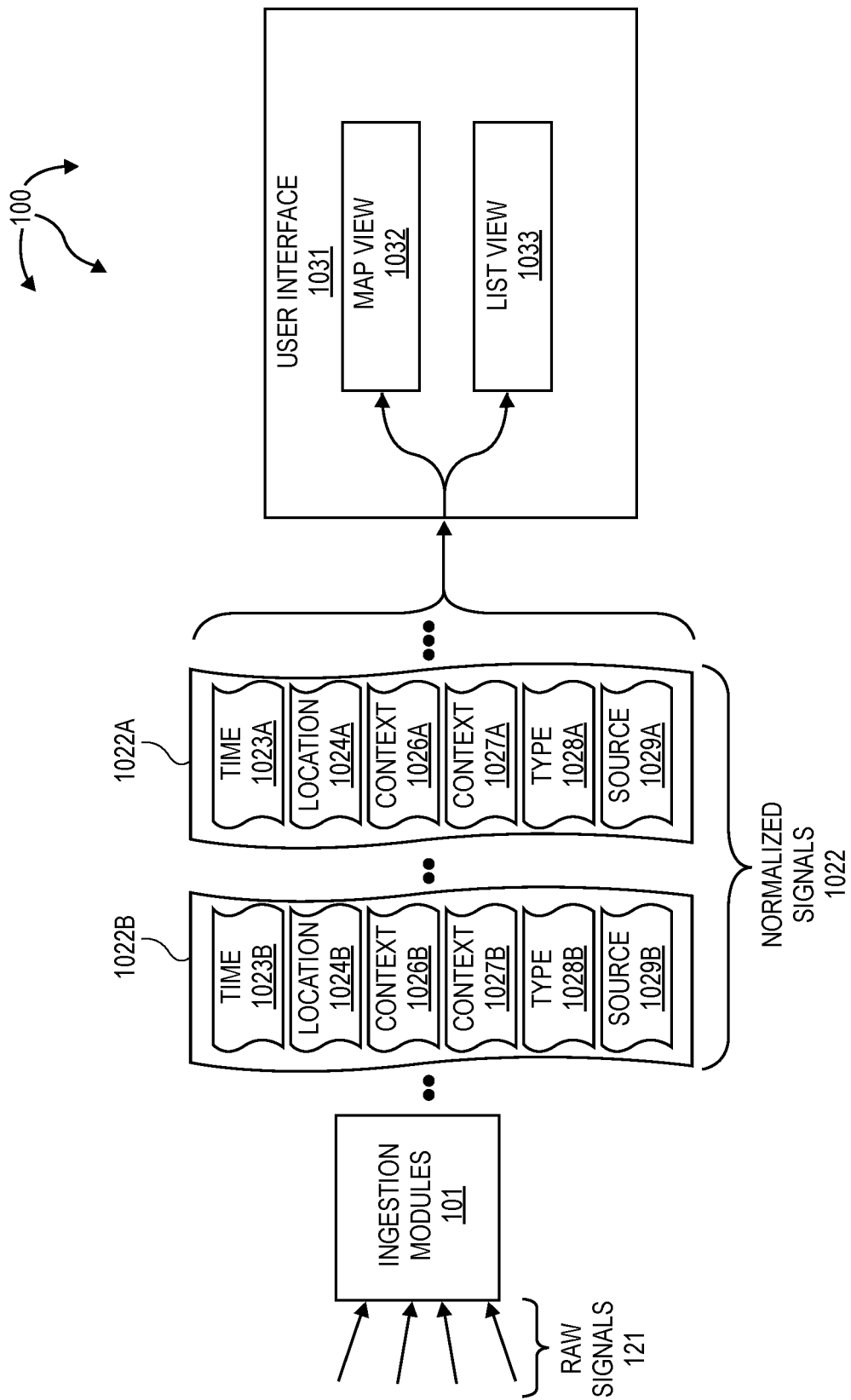
FIG. 10B illustrates an example computer architecture that facilitates unifying presentation of signals from the organization at a user interface

FIG. 10A illustrates computer architecture 100 that facilitates ingesting signals from an organization. FIG. 10B illustrates computer architecture 100 that facilitates unifying presentation of signals from the organization at a user interface. Components in FIGS. 10A and 10B can interoperate to normalize different types of ingested signals from different silos of an organization and present normalized data at a user interface.

In general, ingestion module(s) 101 can ingest raw signals from organization 1078. As depicted, organization 1078 includes silos 1071, 1072, and 1073. Data and/or signals included in silos 1071, 1072, and 1073 can be defined as private to organization 1078 and/or as non-private. Data and/or signals can include social posts, traffic camera feeds, other camera feeds, listening device feeds, 911 calls, weather data, planned events, IoT device data, crowd sourced traffic and road information, satellite data, air quality sensor data, public radio communication, database entries, etc. Ingestion modules 101 can ingest raw signals from organization 1078 on an ongoing basis and in essentially real-time.

As depicted, ingestion module(s) 101 include ingestion module 1074, ingestion module 1076, ingestion module 1077, and signal formatter 180. Signal formatter 180 further includes processing module 1081, processing module 1082, and processing modules 1083.

Organization 1078 can configure data privacy settings, including data aggregation privacy settings and/or data access privacy settings, for signals originating within organization 1078. Ingestion modules 101 including ingestion module 1074, ingestion module 1076, ingestion module 1077, signal formatter 180, processing module 1081, processing module 1082, and processing modules 1083 can adhere to data privacy settings of organization 1078.

For each type of signal, a corresponding ingestion module and signal processing module can interoperate to normalize the signal into a time, location, context format. For example, ingestion module 1074 and processing module 1081 can interoperate to normalize social signals from silo 1071 into the time, location, context format. Similarly, ingestion module 1076 and processing module 1082 can interoperate to normalize signals from silo 1072 into the time, location, context format. Likewise, ingestion module 1077 and processing module 1083 can interoperate to normalize signals from silo 1073 into the time, location, context format.

In one aspect, signal content exceeding specified size requirements (e.g., audio or video) is cached upon ingestion. Data ingestion modules 101 can include a URL or other identifier to the cached content within the context for the signal.

Thus, in general, any of the raw signals received from organization 1078 can be normalized into normalized signals including time, location, and context. Data ingestion modules 101 can send normalized signals 1022 to event user interface 1031. For example, ingestion module(s) 101 can send normalized signal 1022A, including time 1023A, location 1024A, context 1026A, content 1027A (e.g., content of the raw signal), signal type 1028A, and signal source 1029A to user interface 1031. Similarly, data ingestion modules 101 can send normalized signal 1022B, including time 1023B, location 1024B, context 1026B, content 1027B (e.g., content of the raw signal), signal type 1028B, and signal source 1029B to user interface 1031.

User interface 1031 can present data contained in normalized signals 1022A, 1022B, etc. in a variety of views including map view 1032 and list view 1033. In one aspect, user interface 1031 is integrated with and/or interoperates with data analysis modules permitting additional views and data analysis of normalized signals 1022A, 1022B, etc. User interface 1031 can adhere to data privacy settings of organization 1078.

Further, ingestion modules 101 can concurrently ingest and normalize siloed data from different organizations while complying with data privacy settings of each different organization. For example, ingestion modules 101 can concurrently ingest and normalize siloed data from organization 1078 while complying with data privacy settings of organization 1078 and other organizations. User interface 1031 can also comply with data privacy settings of each different organization. For example, user interface 1031 can comply with data privacy settings of organization 1078 and other organizations.

Accordingly, ingestion modules 101 and user interface 1031 can interoperate to ensure compliance with privacy settings of organization 1078 and other organizations. For example, it may be that organization 1078 indicates raw signals/data in silos 1071, 1072, 1073, etc. is to remain private. As such, ingestion modules 101 and user interface 1031 can ensure that raw signals/data in silos 1071, 1072, 1073, etc. do not leak outside of organization 1078. Alternately, it may be that organization 1078 indicates raw signals/data in silos 1071, 1072, 1073, etc. is non-private and shareable with one or more other entities/organizations. As such, ingestion modules 101 and user interface 1031 can ensure that raw signals/data in silos 1071, 1072, 1073, etc. are not accessible to entities/organizations other than organization 1078 and the one or more other entities/organizations.

Figure 11:
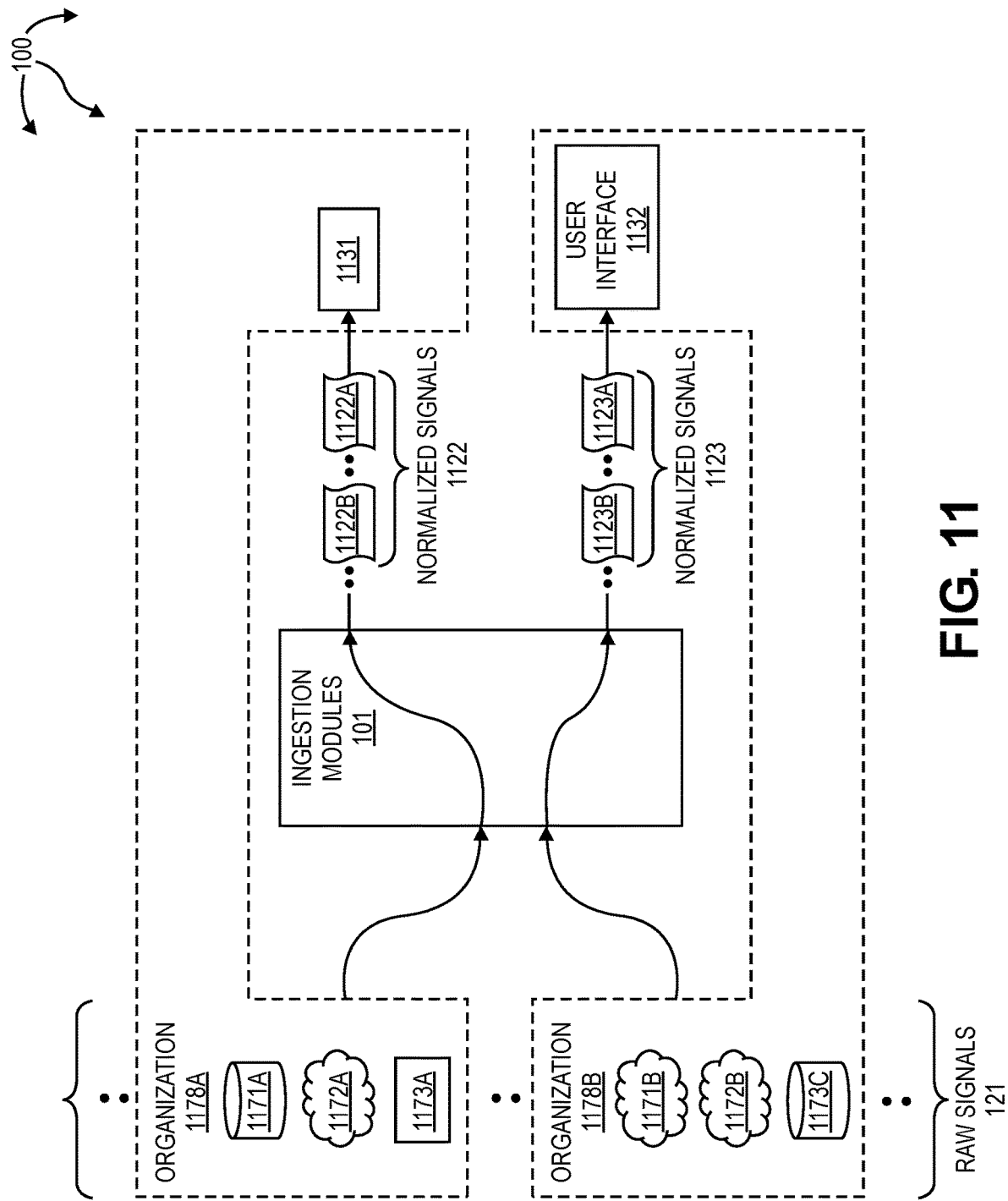
FIG. 11 illustrates an example computer architecture ingesting signals from multiple organizations and presenting the signals at corresponding user interfaces.

Turning to FIG. 11, FIG. 11 illustrates computer architecture 100 ingesting signals from multiple organizations and presenting the signals at corresponding user interfaces. As depicted, computer architecture 100 includes organizations 1178A and 1178B and ingestion modules 101. Organizations 1178A and 1178B can each configure corresponding data privacy settings, including data aggregation privacy settings and/or data access privacy settings, for signals originating within organizations 1178A and 1178B respectively. Ingestion modules 101 can adhere to data privacy settings of both organization 1178A and organization 1178B.

Ingestion modules 101 can concurrently ingest raw signals 121 from organization 1178A and from organization 1178B, including signals from silos 1171A, 1172A, 1173A, 1171B, 1172B, and 1173B in adherence with data privacy settings of both organization 1178A and organization 1178B. Ingestion modules 101 can output normalized signals 1122 from raw signals ingested from organization 1178A. Normalized signals 1122 can be output to user interface 1131. Similarly, ingestion modules 101 can output normalized signals 1123, including normalized signals 1123A, 1123B, etc., from raw signals ingested from organization 1178B. Normalized signals 1123 can be output to user interface 231. Thus, data can pass from an organization to ingestion modules 101 for normalization and then from ingestion modules 101 back to the organization for presentation, data analysis, etc. Ingestion modules 101 can include a Web based API permitting organizations to call ingestions modules 101 from their own code.

As described, ingestion modules 101 can adhere to data privacy settings of the multiple organizations. Thus, even when ingestion modules 101 concurrently access signals/data from different organizations, ingestion modules 101 can prevent inappropriate signal/data co-mingling during normalization. For example, based on data privacy settings of organization 1178A and 1178B, ingestion modules 101 can prevent signal/data co-mingling during normalization of normalized signals 1122 and 1123.

Signals from organizations can combined with public signals to detect relevant events.

Figure 12:
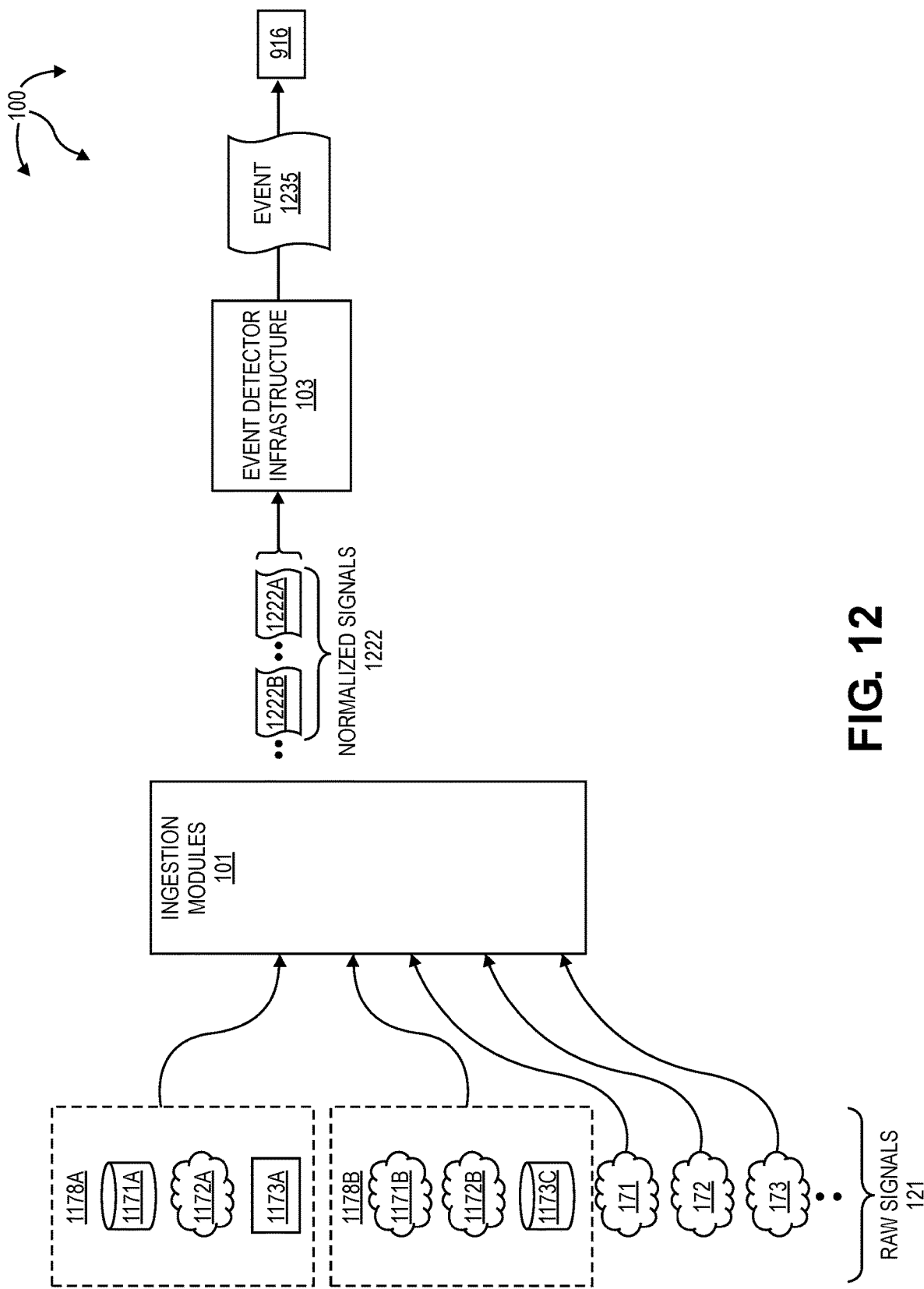
FIG. 12 illustrates an example computer architecture ingesting signals from multiple organizations and sources and detecting an event.

Turning to FIG. 12, FIG. 12 illustrates computer architecture 100 ingesting signals from multiple organizations and sources and detecting an event. As depicted, computer architecture 100 includes organization 1178A, organization 1178B, social signals 171, web signals 172, and streaming signals 173. Ingestion modules 101 can concurrently ingest raw signals 121 from organization 1178A including signals from silos 1171A, 1172A, 1173A, from organization 1178B including signals for silos 1171B, 1172B, and 1173B, from social signals 171, from web signals 172, and from streaming signals 173 (in accordance with data privacy settings of organizations 1178A and 1178B). Ingestion modules 101 can output normalized signals 1222 (including normalized signals 1222A, 1222B, etc.) from the ingested raw signals 121. Normalized signals 1222 can include a mix and intermingling of signals from organization 1178A, organization 1178B, and publicly available signals (in accordance with various data privacy settings)

Ingestion modules 101 can send normalized signals 1222 to event detection infrastructure 103. Event detection infrastructure 103 and event notification 916 can adhere to data privacy settings of the multiple organizations. Event detection infrastructure 103 can detect event 1235 from normalized signals 1222. Event detection infrastructure 103 can send event 1235 to event notification module 916. Event notification module 916 can notify one or more entities about event 1235. Accordingly, an event can be detected from a mix of public and otherwise private and/or non-private signals and relevant entities/organization notified (both in adherence with relevant data privacy settings).

Event detection infrastructure 103 can utilize components and/or methods described with respect to any of FIG. 2, 3, 4, or 5 (e.g., evaluation module 206 and/or validator 204) to detect an event from a plurality of normalized signals that includes at least one normalized private signal or at least one normalized non-private signal. Organizations can configure data aggregation privacy settings to define how their private signals and/or non-private signals can be aggregated with other signals. Event detection infrastructure 103 can simultaneously adhere to aggregation data privacy settings for a plurality of different organizations to prevent inappropriate signal aggregation.

In accordance with data aggregation privacy settings, event detection infrastructure 103 can detect an event from two private signals from the same organization, from a private signal and a non-private signal from the same organization or from different organizations, from a private signal and a public signal, from two non-private signals from the same organization or from different organizations, or from a non-private signal and a public signal (as well as from two public signals).

In one aspect, a possible event is detected from the features of one normalized private signal and then validated as an event from the features of another normalized private signal. In another aspect, a possible event is detected from the features of a normalized private signal and then validated as an event from the features of a normalized non-private signal (or vice versa). In a further aspect, a possible event is detected from the features of a normalized private signal and then validated as an event from the features of a normalized public signal (or vice versa). In an additional aspect, a possible event is detected from the features of one normalized non-private signal and then validated as an event from the features of another normalized non-private signal. In a further additional aspect, a possible event is detected from the features of a normalized non-private signal and then validated as an event from the features of a normalized public signal (or vice versa).

Organizations can separately configure data access privacy settings to define how their private signals and/or non-private signals, as well as intelligence derived therefrom, (e.g., event detections) can be accessed by other entities and/or organizations (if at all). An organization can configure data access privacy settings similar to or different from their data aggregation privacy settings. For example, an organization may configure data aggregation privacy settings to permit aggregation of their private signals with public signals during event detection. In one aspect, the organization can also define data access privacy settings that permit public access to any detected events. On the other hand, the organization can define data access privacy settings that limit access to any detected events to the organization (and sub units thereof). Thus, although event detection 103 is permitted to aggregate private and public signals during event detection, event notification 916 may be limited to notifying the organization about detected events.

Event detection infrastructure 103 can utilize components and/or methods described with respect to any of FIGS. 6A, 6B, 6C, 6D, 6E, 7 and 8 (e.g., sequence manager 604, feature extractor 609, sequence storage 613, multi-source classifier 612, and event detector 611) to include private signals/data and/or non-private signals/data in a signal sequence in accordance with data privacy settings and make decisions based on signal sequences including private signals/data and/or non-private signals/data in accordance with data privacy settings. For example, sequence manager 604 can decay signal sequences including private signals/data and/or non-private signals/data. Event detector 611 can detect events from detections.

In one aspect, organizations submit data privacy settings (e.g., data aggregation privacy settings and/or data access privacy settings) to an authorization infrastructure. The authorization infrastructure manages authorization of different entities and/or organizations to aggregate private and non-private signals (or data) in accordance with submitted data privacy settings. For example, the authorization infrastructure can permit or prevent signal/data aggregation based on data aggregation privacy settings. The authorization infrastructure also manages authorization of different entities and/or organizations to access private and non-private signals (or data) (or intelligence derived therefrom) in accordance with submitted data privacy settings. For example, the authorization infrastructure can permit or prevent signal/data access (or intelligence derived therefrom, for example, detected events) in accordance based on data access privacy settings. Other modules, for example, ingestion module(s) 101, event detection infrastructure 103, and event notification 916, can interoperate with the authorization infrastructure to aggregate and/or to access signals/data in adherence with data privacy settings of various organizations.

Accordingly, in accordance with data privacy settings, aspects of the invention facilitate acquisition of live, ongoing forms of data into an event detection system. Signals from multiple sources of data (including private, non-private, and public) can be combined and normalized for a common purpose (e.g., of event detection). Data ingestion, event detection, and event notification can process data through multiple stages of logic with concurrency.

A unified interface can handle incoming signals and content of any kind. The interface can handle live extraction of signals across dimensions of time, location, and context. In some aspects, heuristic processes are used to determine one or more dimensions. Acquired signals can include text and images as well as live-feed binaries, including live media in audio, speech, fast still frames, video streams, etc.

Signal normalization enables the world's live signals to be collected at scale and analyzed for detection and validation of live events happening globally. A data ingestion and event detection pipeline aggregates signals and combines detections of various strengths into truthful events. Thus, normalization increases event detection efficiency facilitating event detection closer to "live time" or at "moment zero".

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A method, implemented at a computing system comprising one or more processors, the method comprising:
   accessing, a normalized private data signal that is private to an organization based on data privacy access settings associated with the normalized private data signal for the organization;
   deriving, at the one or more processors, first one or more features of the normalized private data signal;
   determining that the first one or more features do not satisfy conditions to be identified as an event;
   accessing, at the one or more processors, another normalized data signal based on any data privacy access settings associated with the other normalized data signal;
   deriving, at the one or more processors, second one or more features of the other normalized data signal;
   aggregating, at the one or more processors, the first one or more features with the second one or more features into aggregated features;
   configuring access to the aggregated features based on data privacy aggregation settings associated with the normalized private data signal and data privacy aggregation settings associated the other normalized data signal;
   detecting an event from the aggregated features.

2. The method of claim 1, wherein aggregating the first one or more features with the second one or more features into aggregated features comprises:
   detecting a possible event from the first one or more features; and
   validating the possible event as an actual event based on the second one or more features.

3. The method of claim 2, wherein accessing the other normalized data signal comprises accessing the other normalized data signal from among: another normalized private data signal private to the organization, a normalized non-private data signal, or a normalized public data signal.

4. The method of claim 3, wherein accessing the other normalized data signal comprises accessing a normalized non-private data signal controlled by another organization.

5. The method of claim 1, further comprising including the normalized private data signal in a signal sequence;

determining that the other normalized data signal has sufficient temporal similarity to the normalized private data signal;

determining that the other normalized data signal has sufficient spatial similarity to the normalized private data signal; and including the other normalized data signal in the signal sequence.

6. The method of claim 5, wherein aggregating the first one or more features with the second one or more features into aggregated features comprises deriving features of the signal sequence from the first one or more features and the second one or more features.

7. The method of claim 6, wherein deriving features of the signal sequence comprises deriving one or more of: a percentage, a count, a histogram, or a duration.

8. The method of claim 1, further comprising, prior to aggregating the first one or more features with the second one or more features:

accessing the data privacy settings; and determining that the data privacy settings permit aggregation of the normalized private data signal with the other normalized data signal.

9. The method of claim 1, wherein accessing the other normalized data signal comprises accessing the other normalized signal selected from among: another normalized private data signal private to the organization, a normalized non-private data signal, or a normalized public data signal.

10. The method of claim 9, wherein accessing the other normalized data signal comprises accessing a normalized non-private data signal controlled by another organization.

11. The method of claim 1, wherein the normalized private data signal is one of: an image from a traffic camera feed, a 911 call, weather data, IoT device data, satellite data, satellite imagery, a sound clip from a listening device, data from air quality sensors, a sound clip from radio communication, crowd sourced traffic information, or crowd sourced road information.

12. The method of claim 1, wherein deriving the first one or more features comprises deriving the first one or more features from a first single source probability assigned to the normalized private data signal;

wherein deriving the second one or more features comprises deriving the second one or more features from a second single source probability assigned to the other normalized data signal;

wherein aggregating the first one or more features with the second one or more features comprises aggregating the first single source probability and the second single source probability into a multisource probability; and wherein detecting an event from the aggregated features comprises detecting an event from the multisource probability.

13. A method, implemented at a computing system comprising one or more processors, comprising:

accessing a normalized non-private data signal, that is controlled by an organization, based on data privacy access settings associated with the normalized non-private data signal for the organization;

deriving first one or more features of the normalized non-private data signal;

determining that the first one or more features do not satisfy conditions to be identified as an event;

accessing another normalized data signal based on any data privacy access settings associated with the other normalized data signal;

deriving second one or more features of the other normalized data signal;

aggregating the first one or more features with the second one or more features into aggregated features;

configuring access to the aggregated features based on the data privacy aggregation settings associated with the normalized private data signal and the data privacy aggregation settings associated with the other normalized data signal; and detecting an event from the aggregated features.

14. The method of claim 13, wherein aggregating the first one or more features with the second one or more features into aggregated features comprises:

detecting a possible event from the first one or more features; and validating the possible event as an actual event based on the second one or more features.

15. The method of claim 14, wherein accessing the other normalized data signal comprises accessing the other normalized data signal selected from among: a normalized private data signal private to the organization, another normalized non-private data signal, or a normalized public data signal.

16. The method of claim 15, wherein accessing the other normalized data signal comprises accessing a normalized non-private data signal controlled by another organization.

17. The method of claim 13, further comprising including the normalized non-private data signal in a signal sequence;

determining that the other normalized data signal has sufficient temporal similarity to the normalized non-private data signal;

determining that the other normalized data signal has sufficient spatial similarity to the normalized non-private data signal; and including the other normalized data signal in the signal sequence.

18. The method of claim 17, wherein aggregating the first one or more features with the second one or more features into aggregated features comprises deriving features of the signal sequence from the first one or more features and the second one or more features.

19. The method of claim 17, wherein deriving features of the signal sequence comprises deriving one or more of: a percentage, a count, a histogram, or a duration.

20. The method of claim 13, further comprising, prior to aggregating the first one or more features with the second one or more features:

accessing the data privacy settings; and determining that the data privacy settings permit aggregation of the normalized non-private data signal with the other normalized data signal.

21. The method of claim 13, wherein accessing the other normalized data signal comprises accessing the other normalized data signal, the other normalized data signal selected from among: a normalized private data signal, another normalized non-private data signal, or a normalized public data signal.

22. The method of claim 21, wherein accessing the other normalized data signal comprises accessing a normalized non-private data signal controlled by another organization.

23. The method of claim 13, wherein the normalized non-private data signal is one of: an image from a traffic camera feed, a 911 call, weather data, IoT device data, satellite data, satellite imagery, a sound clip from a listening device, data from air quality sensors, a sound clip from radio communication, crowd sourced traffic information, or crowd sourced road information.

24. The method of claim 13, wherein deriving first one or more features comprises deriving the first one or more features from a first single source probability assigned to the normalized non-private data signal;
- wherein deriving second one or more features comprises deriving the second one or more features from a second single source probability assigned to the other normalized data signal;
- wherein aggregating the first one or more features with the second one or more features comprises aggregating the first single source probability and the second single source probability into a multisource probability; and
- wherein detecting an event from the aggregated features comprises detecting an event from the multisource probability.

\* \* \* \* \*